US012746644B1

(12) United States Patent
Ebrahim Amini

(10) Patent No.: US 12,746,644 B1
(45) Date of Patent: Sep. 29, 2026

(54) ADJUSTABLE WRENCH WITH AN INTEGRATED CLUTCH

(71) Applicant: Adel Ebrahim Amini, North York (CA)

(72) Inventor: Adel Ebrahim Amini, North York (CA)

( * ) Notice: Subject to any disclaimer, the term of this patent is extended or adjusted under 35 U.S.C. 154(b) by 0 days.

(21) Appl. No.: 19/334,678

(22) Filed: Sep. 19, 2025

(51) Int. Cl.
*B25B 21/00* (2006.01)
*B25F 5/00* (2006.01)
*B25F 5/02* (2006.01)

(52) U.S. Cl.
CPC ............ *B25B 21/002* (2013.01); *B25F 5/001* (2013.01); *B25F 5/02* (2013.01)

(58) Field of Classification Search
CPC .. B25B 7/12; B25B 9/04; B25B 13/08; B25B 13/10; B25B 13/12; B25B 13/14; B25B 13/16; B25B 13/44; B25B 13/48; B25B 13/50; B25B 21/002; B25B 21/004; B25B 21/008; B25B 23/0007; B25B 23/0021; B25B 23/0028; B25B 23/0035; B25B 23/0042; B25B 23/147; B25F 5/001; B25F 5/02
See application file for complete search history.

(56) References Cited

U.S. PATENT DOCUMENTS 3,024,683 A * 3/1962 Finn ........................ B25B 13/14 81/165
3,675,330 A * 7/1972 Drapen ................ A61C 17/005 433/125
4,512,221 A * 4/1985 Picone .................... B25B 13/14 81/170
5,682,802 A * 11/1997 Mazzone ................ B25B 13/12 81/135
6,477,921 B1 * 11/2002 Picone .................... B25B 13/14 81/170
7,235,029 B2 6/2007 Klemen
2007/0157767 A1 7/2007 Picone
2008/0000332 A1 * 1/2008 Wu ......................... B25B 13/14 81/170
2012/0103142 A1 5/2012 Sroka
2023/0321796 A1 * 10/2023 Speckman .............. B25B 21/02 81/54

FOREIGN PATENT DOCUMENTS

| | | | |
|---|---|---|---|
| CN | 201077038 | | 6/2008 |
| CN | 109108872 | * | 1/2019 |
| CN | 120645168 | * | 9/2025 |
| WO | 2021236773 | | 11/2021 |

* cited by examiner

*Primary Examiner* — Robert J Scruggs

(57) ABSTRACT

An adjustable wrench with a clutch-and-release feature is a device that provides the clamping force necessary to engage the target fastener or object without risk of damage to the motor components of the device. The device includes a fixed jaw, a movable jaw, a wrench handle, a motorized worm screw, a controller, and a portable power source. The fixed jaw and the movable jaw enable the selective engagement of the device to the target fastener or object. The wrench handle corresponds to the main structure of the device that can be physically held by the user. The motorized worm screw corresponds to the motorized mechanism that drives the movement of the movable jaw. The controller facilitates the automatic operation of the motorized worm gear, while the portable power source provides the electrical power necessary for the operation of the motorized worm gear.

19 Claims, 23 Drawing Sheets

ADJUSTABLE WRENCH WITH AN INTEGRATED CLUTCH

FIELD OF THE INVENTION

The present invention relates generally to handheld tools. More specifically, the present invention provides a motorized adjustable wrench with clutch and limited-release features for the movable jaw.

BACKGROUND OF THE INVENTION

In general, adjustable wrenches include a fixed jaw attached to the main body and a movable jaw that is coupled to a worm gear. The movable jaw moves back and forth by the turning of the wrench's worm gear that is mechanically engaged to the movable jaw. Different mechanisms are implemented to help turn the wrench's worm gear. Traditional adjustable wrenches utilize a manual mechanism that requires the user to manually turn the worm gear. Newer adjustable wrenches utilize a motorized mechanism that automatically turns the worm gear. Both versions of current adjustable wrenches have many issues. For manual adjustable wrenches, turning the worm gear is inconvenient especially when there is not enough room (in time of using) for fingers to turn the worm gear. In addition, the clamping force between the movable and fixed jaws resulting from the turning of the worm gear is usually insufficient or excessive. As result, manual adjustable wrenches can lose clamping force and damage the engaged fastener due insufficient clamping force. On the other hand, excessive force can prevent the worm gear from being manually loosened by the user and create inconvenience in using the adjustable wrench.

Motorized adjustable wrenches also have many issues such as the movable jaw moving too fast which causes accuracy issues in adjusting the required size of the movable jaw. Depending on the motor utilized, motorized adjustable wrenches can fail to generate sufficient clamping force due to the high speed and low power of the motor. If the speed is reduced to increase power, then the motor and gearbox can get damaged once the movable jaw reaches the stop point. This can also result in excessive clamping force and safety issues. So, current motorized adjustable wrenches are unable to provide sufficient clamping force without damaging the motorized components and or reducing safety risks.

Further, the most common issue for adjustable wrenches regardless of being manual or motorized is that the consumer always has difficulty unclamping the movable jaw after engaging a fastener or other item. When the worm gear locks up, the worm gear cannot be rotated to open and unclamp the moveable jaw. This is a significant inconvenience in using existing adjustable wrenches. Therefore, there is a need for an adjustable wrench with an improved mechanism that is not limited by the aforementioned issues of existing adjustable wrenches.

SUMMARY OF THE INVENTION

The present invention provides a motorized adjustable wrench with an integrated clutch that solves the shortcomings of the prior art. The present invention provides a motorized adjustable wrench equipped with an integrated clutch. The integrated clutch is engaged to the motor gearbox and the worm gear of the adjustable wrench to transmit the generated torque to the worm gear in order to apply the clamping force to the target fastener or object. In addition, the integrated clutch can disengage the motor gearbox from the worm gear once the required clamping force is generated as per design.

Further, in some embodiments, the present invention may further include a limited-release feature. The limited-release feature gives the ability to the user to easily unclamp the moveable jaw when the worm gear is locked up and cannot be turned due to applied force during operation and or when the user wants to use limited-release feature to move the movable jaw during operation. The present invention also implements a portable battery (e.g., rechargeable or replaceable battery) and a battery charge level indicator to solve the other issues of the current adjustable wrenches. Further, the electric motor of the present invention is coupled with a 90-degree preassembled gearbox to reduce the motor speed and increase the power output. Furthermore, the rechargeable battery and battery charge level indicator provide a convenient and ecofriendly way to monitor the battery level and operation of the adjustable wrench. Additional features and benefits of the present invention are further discussed in the sections below.

DETAILED DESCRIPTION OF THE INVENTION

Figure 1:
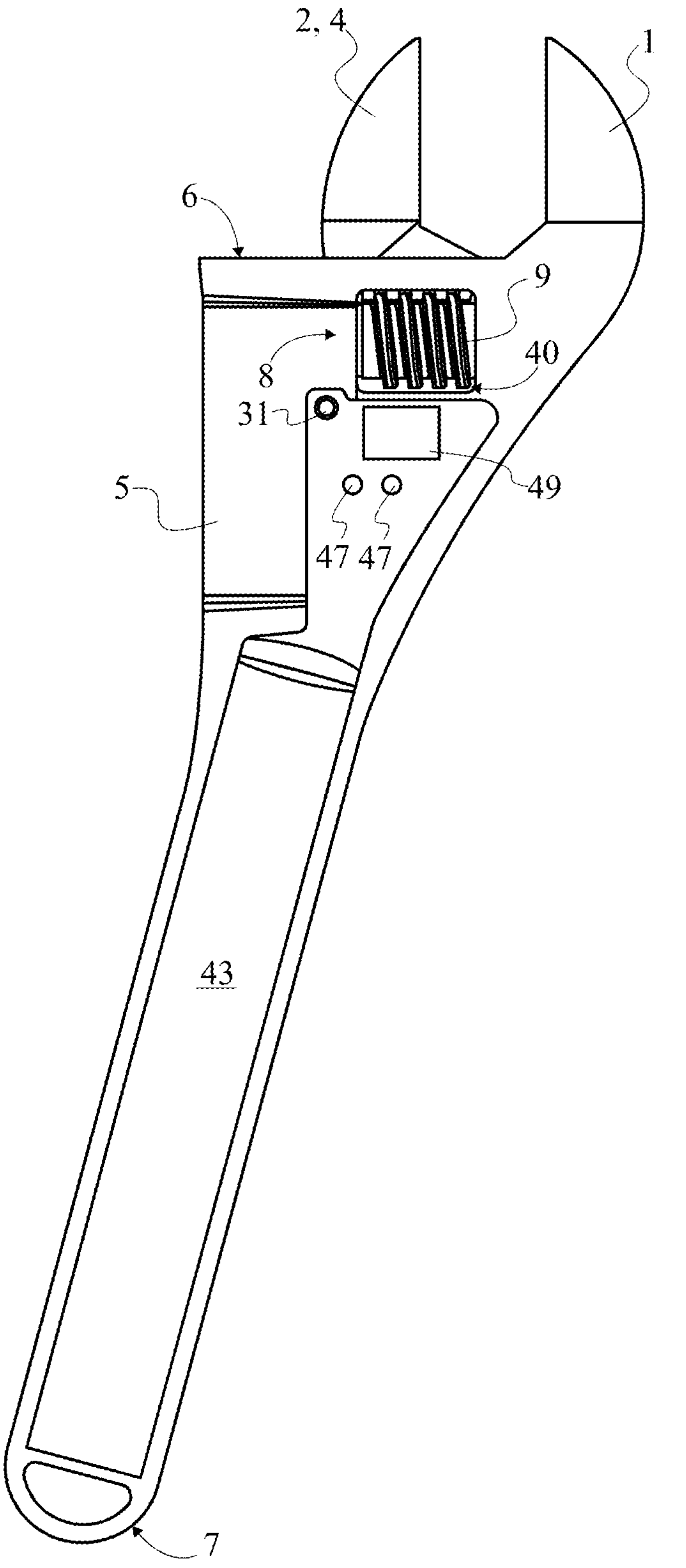
FIG. 1 is a front view of the adjustable wrench of the present invention.
Figure 2:
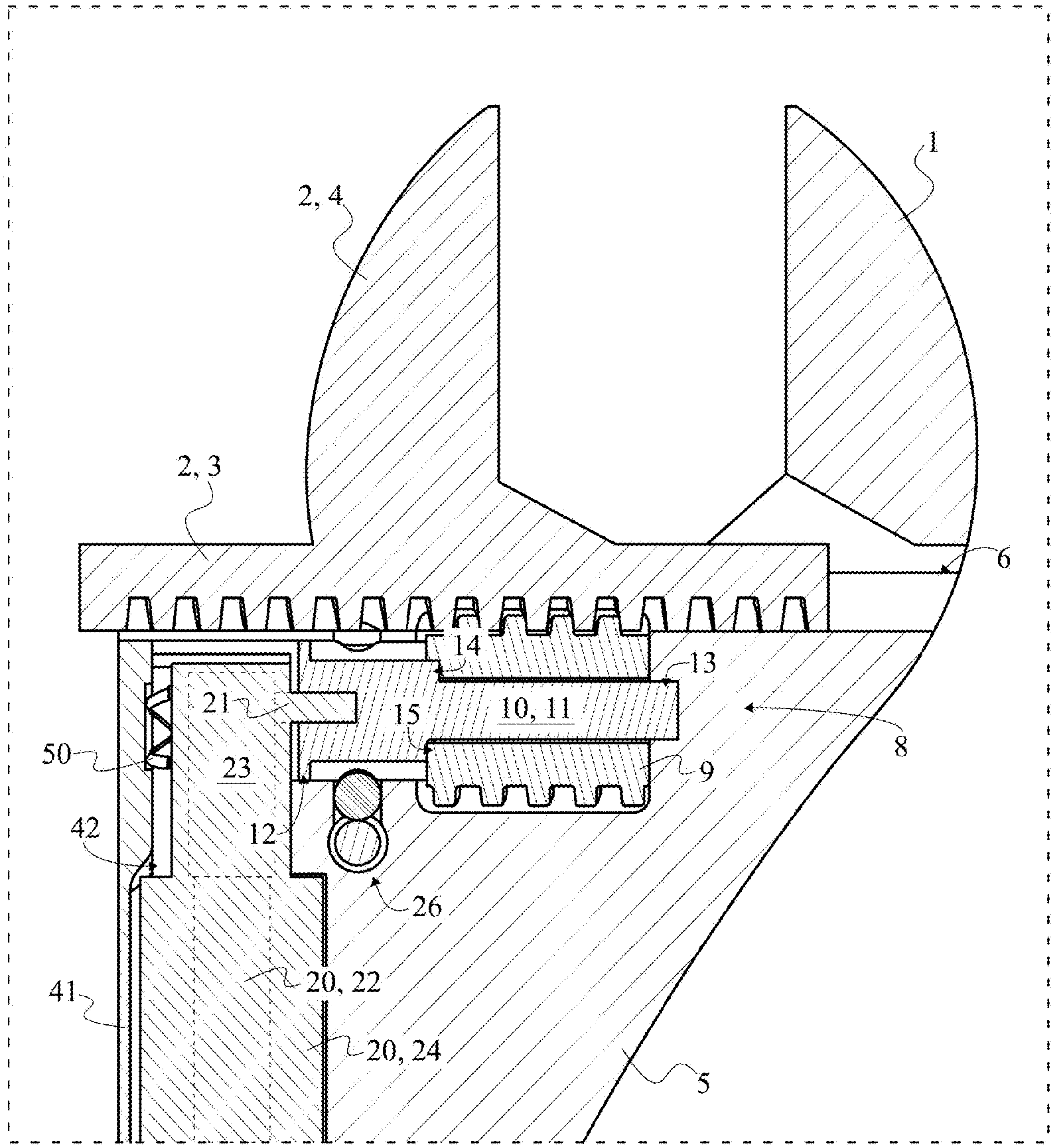
FIG. 2 is a schematic detailed view of the adjustable wrench of the present invention.
Figure 3:
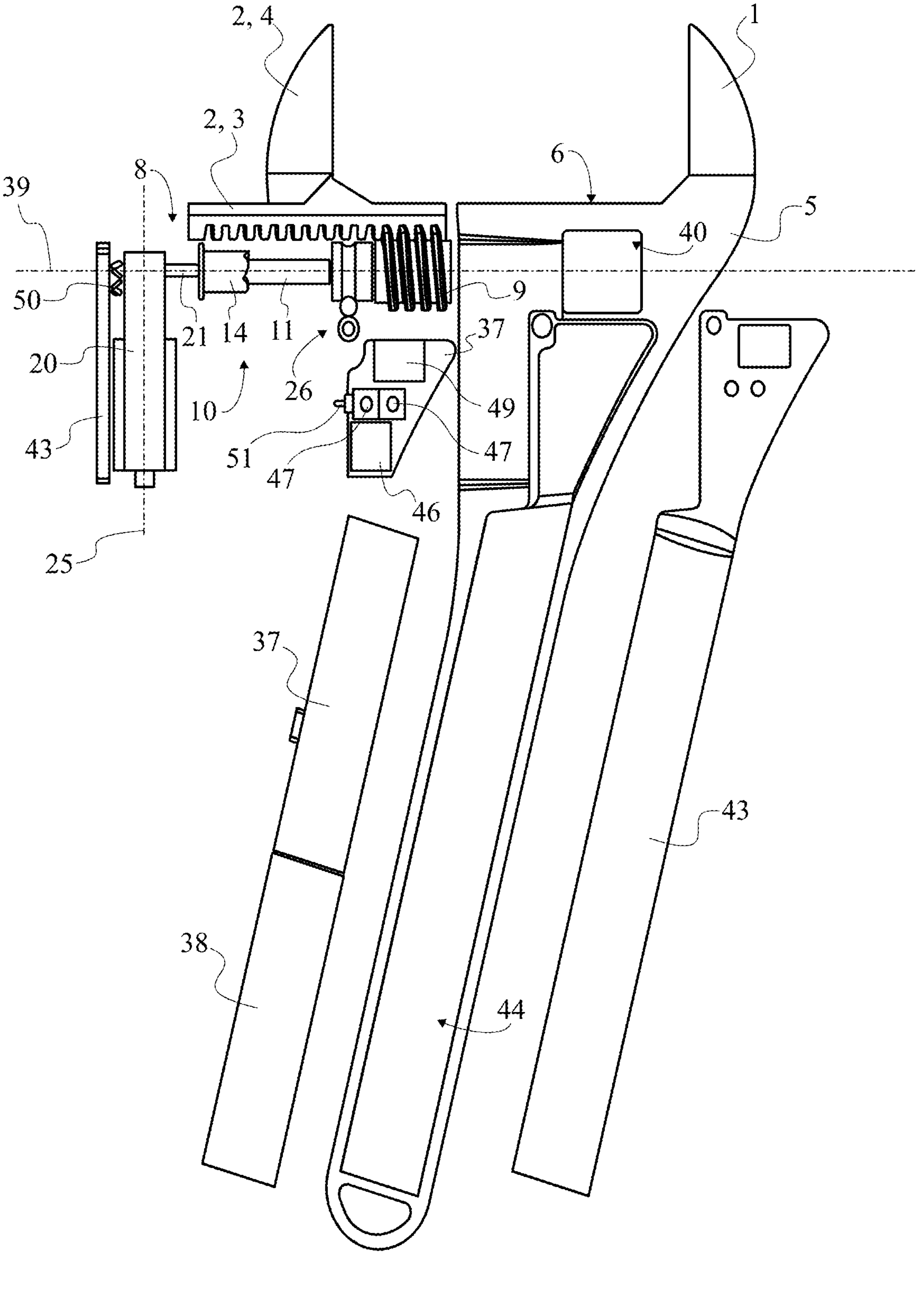
FIG. 3 is a front exploded view of the adjustable wrench of the present invention.
Figure 4:
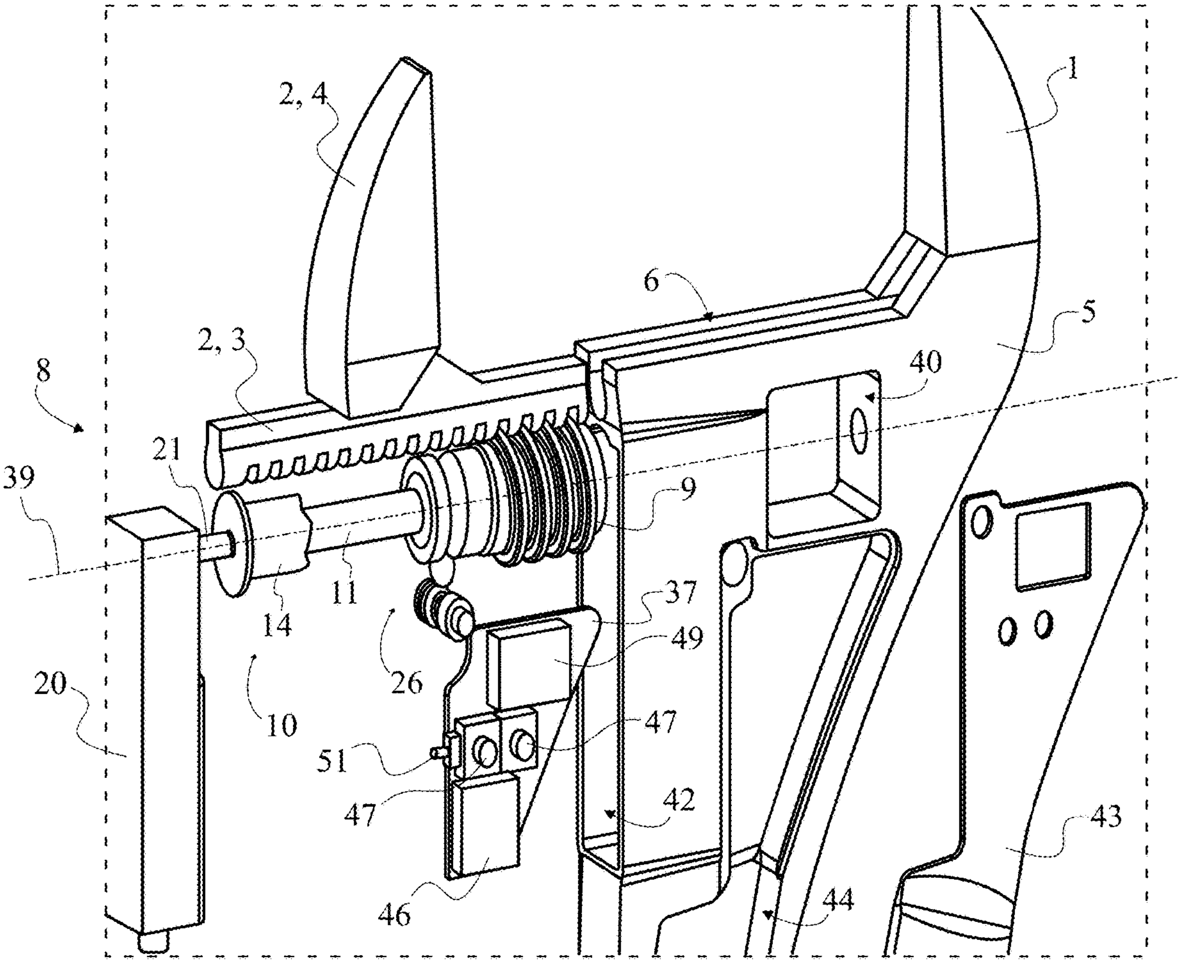
FIG. 4 is a detailed exploded perspective view of the adjustable wrench of the present invention.
Figure 5:
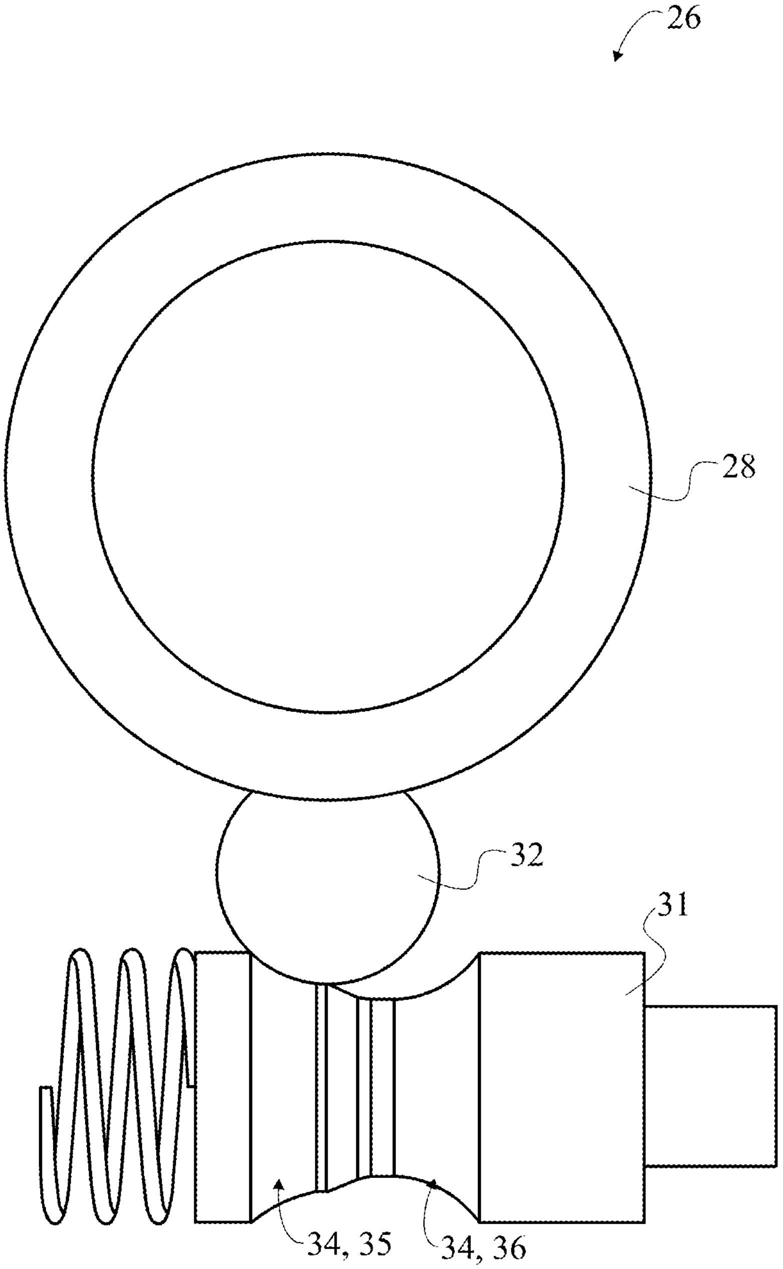
FIG. 5 is a side view of the limited-release feature of the present invention, wherein the spring-loaded pin is shown in the resting configuration.
Figure 6:
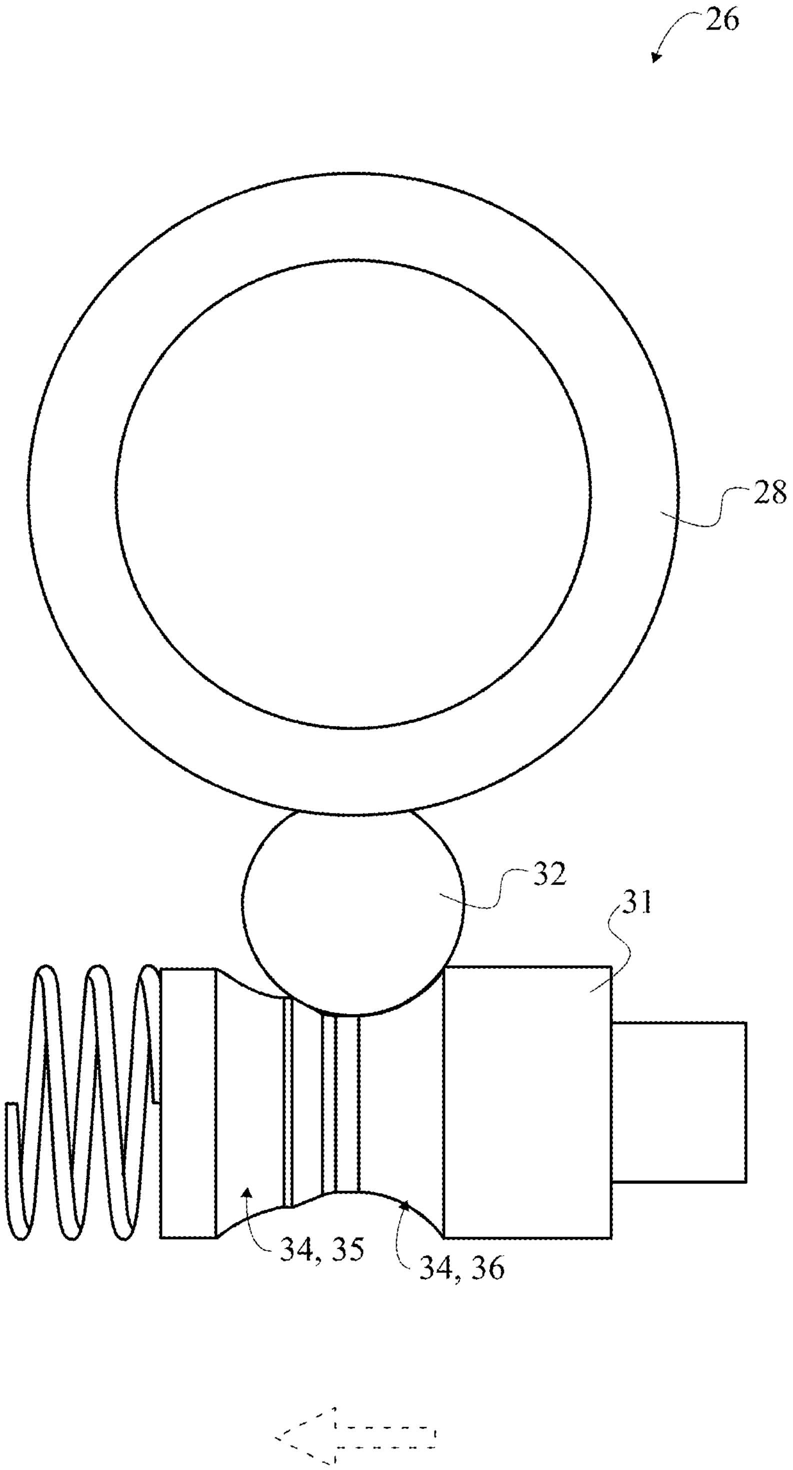
FIG. 6 is a side view of the limited-release feature of the present invention, wherein the spring-loaded pin is shown engaged.

All illustrations of the drawings are for the purpose of describing selected versions of the present invention and are not intended to limit the scope of the present invention.

The present invention provides adjustable wrench with an integrated clutch. The adjustable wrench of the present invention implements a motorized mechanism that can move the movable jaw back and forth and provides the clamping force necessary to engage the target fastener, mating part, or object without risk of damage to the motor gearbox components of the present invention and prevent damaging the mating part (i.e., fastener). In the preferred embodiment, the present invention comprises a fixed jaw 1, a movable jaw 2, a wrench handle 5, a motorized worm screw 8, a controller 37, and a portable power source 38, as can be seen in FIGS. 1 through 15 and 23. The fixed jaw 1 and the movable jaw 2 enable the selective engagement of the present invention to a fastener or other object. The wrench handle 5 corresponds to the main structure of the present invention that can be physically held by the user. The motorized worm screw 8 corresponds to the motorized mechanism that drives the movement of the movable jaw 2. The controller 37 facilitates the automatic operation of the motorized worm gear 9, while the portable power source 38 provides the electrical power necessary for the operation of the motorized worm gear 9 and other electrical components.

The general configuration of the aforementioned components facilitate the safe and efficient fastening of objects with an adjustable wrench. The wrench handle 5 is designed to have the shape and size of traditional adjustable wrenches but is modified to accommodate the electrical and electronic components and provides better handling and weight balance, as can be seen in FIGS. 1 through 15 and 23. In general, the wrench handle 5 comprises a proximal handle edge 6 and a distal handle end 7. The proximal handle edge 6 corresponds to an overall straight edge of the wrench handle 5 that accommodates the fixed jaw 1 and the movement of the movable jaw 2. The distal handle end 7 corresponds to a round end of the wrench handle 5 opposite the proximal handle edge 6 formed by the elongated shape of the wrench handle 5. Further, the motorized worm screw 8 is designed as a portable lightweight mechanism that includes the necessary means to drive the movement of the movable jaw 2.

Figure 16:
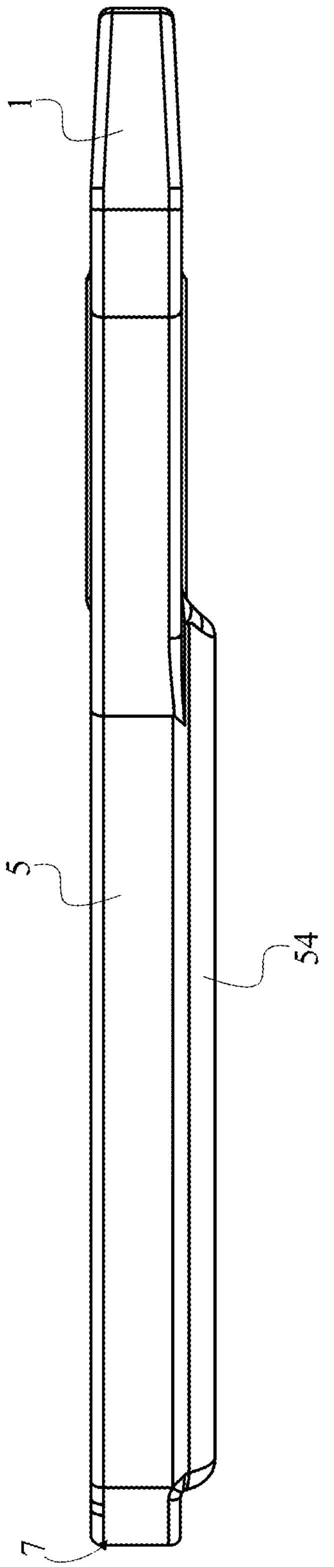
FIG. 16 is a side view of the wrench handle of the adjustable wrench of the present invention.
Figure 17:
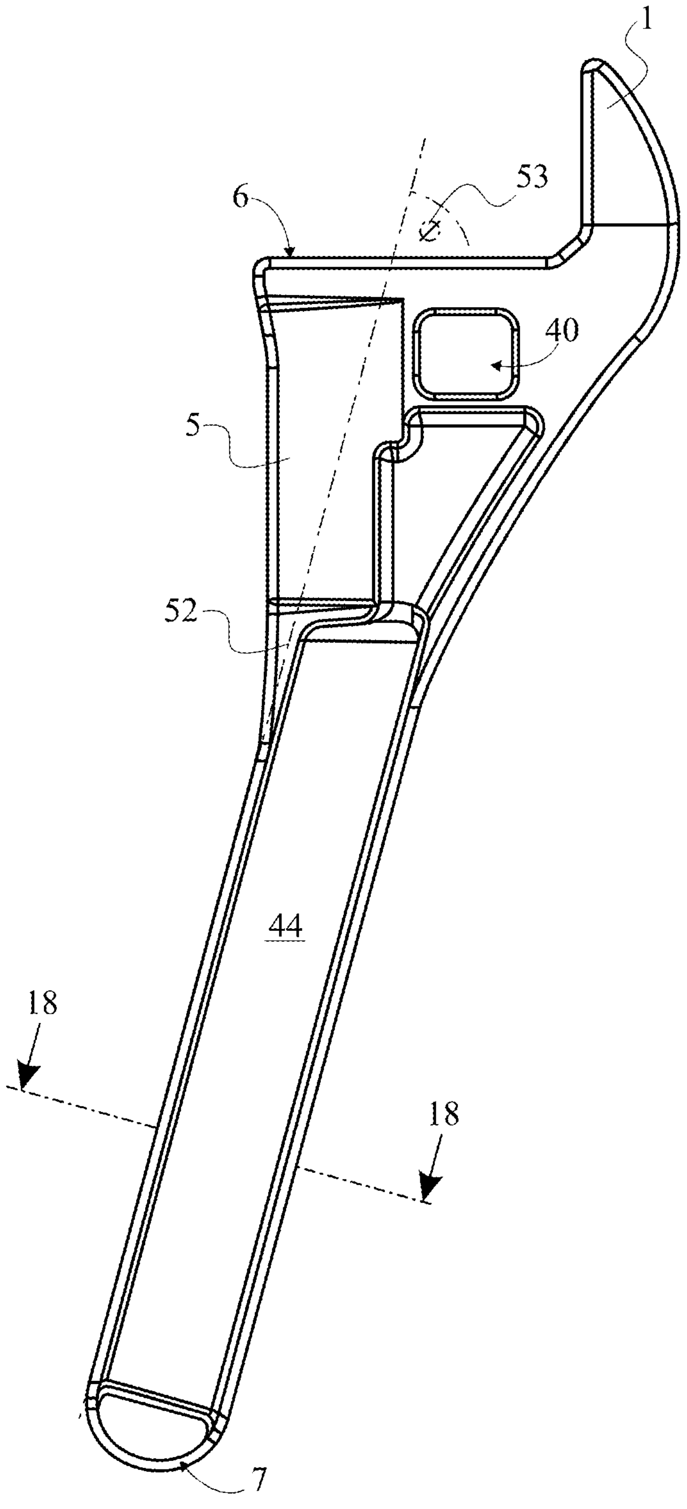
FIG. 17 is a front view of the wrench handle of the adjustable wrench of the present invention.
Figure 18:
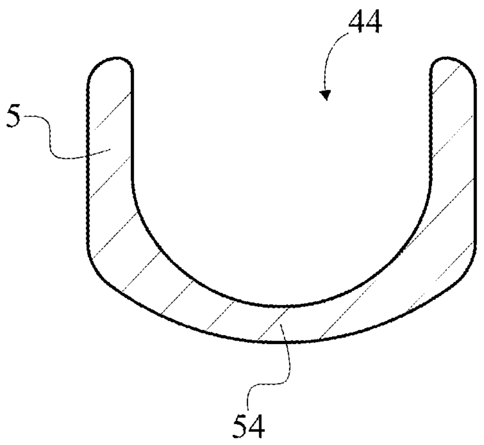
FIG. 18 is a cross-sectional view of the wrench handle of the adjustable wrench taken in the direction of line 18-18 shown in FIG. 17.

Furthermore, the wrench handle 5 may further comprise a rounded protrusion 54 preferably positioned on the rear surface of the wrench handle 5, as can be seen in FIGS. 16 through 18. This round surface enhances the grip the user has on the wrench handle 5 and adds comfort. The rounded protrusion 54 is laterally connected along the wrench handle 5, preferably adjacent to the distal handle end 7. The rounded protrusion 54 can span different sections of the wrench handle 5. For example, the rounded protrusion 54 can span the length of the battery hatch 43 to accommodate the size of the portable power source 38 and other electrical components within the wrench handle 5. Further, the space formed within the wrench handle 5 by the rounded protrusion 54 can provide space to store other tools, such as fasteners. In other embodiments, the wrench handle 5 can be modified to accommodate other components or features.

Generally, the motorized worm screw 8 comprises a worm gear 9, a spring-loaded clutch 10, an electric motor 20, as can be seen in FIGS. 1 through 12, 22, and 23. The worm gear 9 corresponds to the component that engages the movable jaw 2. The spring-loaded clutch 10 facilitates the engagement of the worm gear 9 to the electric motor 20 in order to transmit the torque generated by the electric motor 20 to the worm gear 9. The spring-loaded clutch 10 also facilitates the disengagement of the worm gear 9 from the electric motor 20 once the desired clamp force is achieved with the movable jaw 2 and the fixed jaw 1.

In the preferred embodiment, the present invention can be implemented as follows: the proximal handle edge 6 and the distal handle end 7 are positioned opposite to each other along the wrench handle 5 due to the elongated design of the wrench handle 5, as can be seen in FIGS. 1 through 12. The length 52 of the wrench handle 5 is preferably oriented at an acute angle 53 with the proximal handle edge 6. The acute angle 53 is preferably in the range of 10 to 20 degrees, but other acute angles can be implemented as necessary. The fixed jaw 1 is terminally connected to the proximal handle edge 6, while the movable jaw 2 is slidably mounted along the proximal handle edge 6. The positioning and arrangement of fixed jaw 1 and the movable jaw 2 on the proximal handle edge 6 like the traditional design of an adjustable wrench. However, the fixed jaw 1 and the movable jaw 2 can be implemented differently to accommodate other functional features of the present invention. Further, the worm gear 9 is rotatably mounted through the wrench handle 5 about a gear-rotation axis 39, adjacent to the proximal handle edge 6. The worm gear 9 is implemented in the same manner as how traditional adjustable wrenches implement the worm gear 9. The gear-rotation axis 39 of the worm gear 9 is also oriented parallel to the proximal handle edge 6 so that the worm gear 9 can laterally engage the movable jaw 2.

Figure 19:
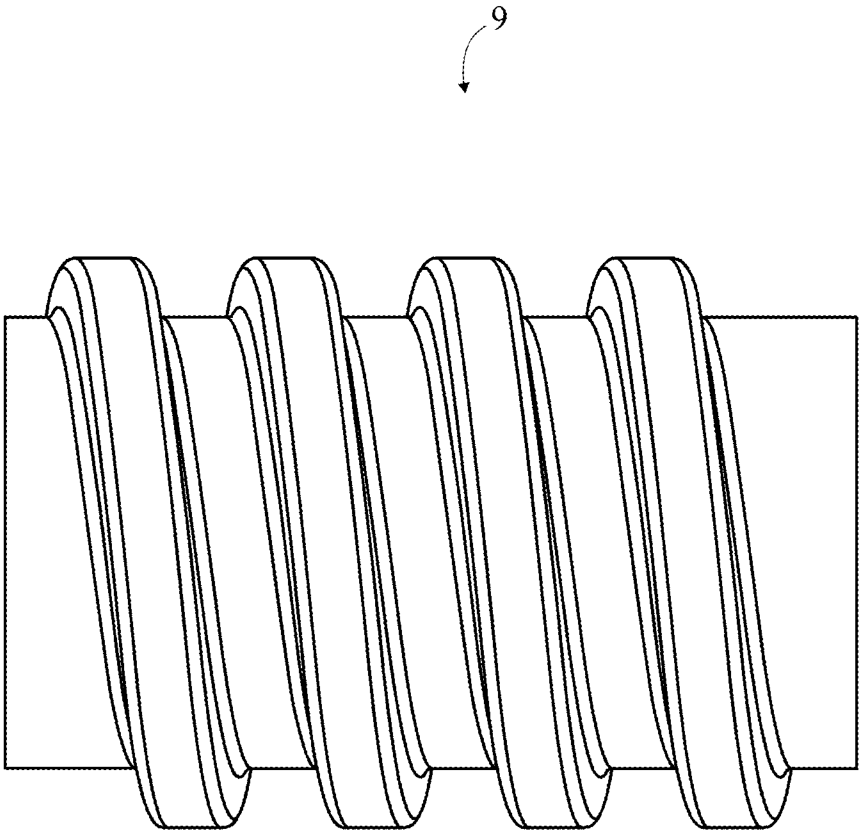
FIG. 19 is a front view of the worm gear of the adjustable wrench of the present invention.

As can be seen in FIG. 19, the worm gear 9 has a specific structural design that improves the overall functionality of the adjustable wrench. In the preferred embodiment, each of the plurality of teeth of the worm gear 9 has a pitch between the range of three to six millimeters (mm). In addition, each of the plurality of teeth of the worm gear 9 preferably has an angle between the range of 60 to 90 degrees.

Figure 22:
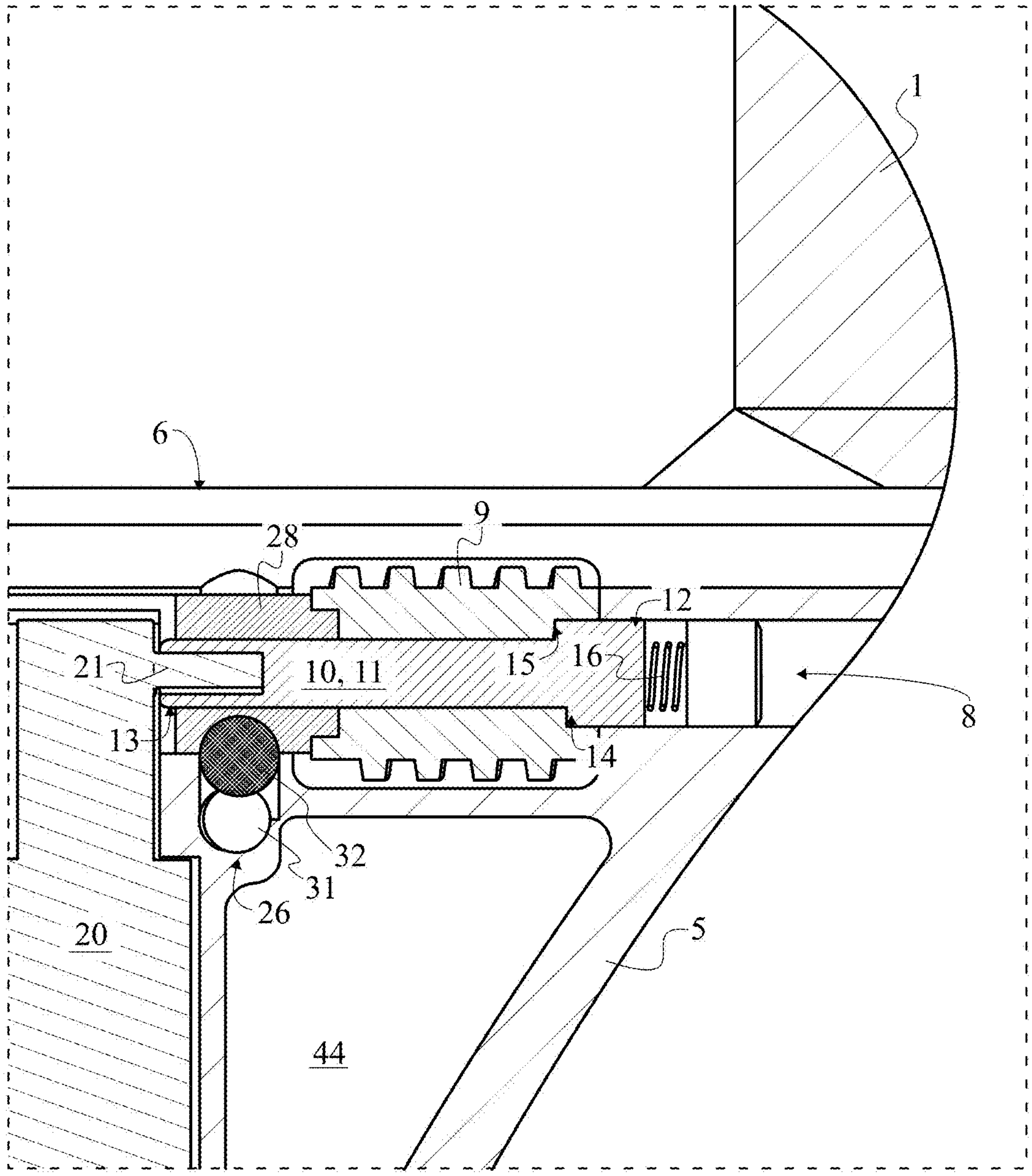
FIG. 22 is a magnified front view of the fourth embodiment of the adjustable wrench of the present invention.
Figure 23:
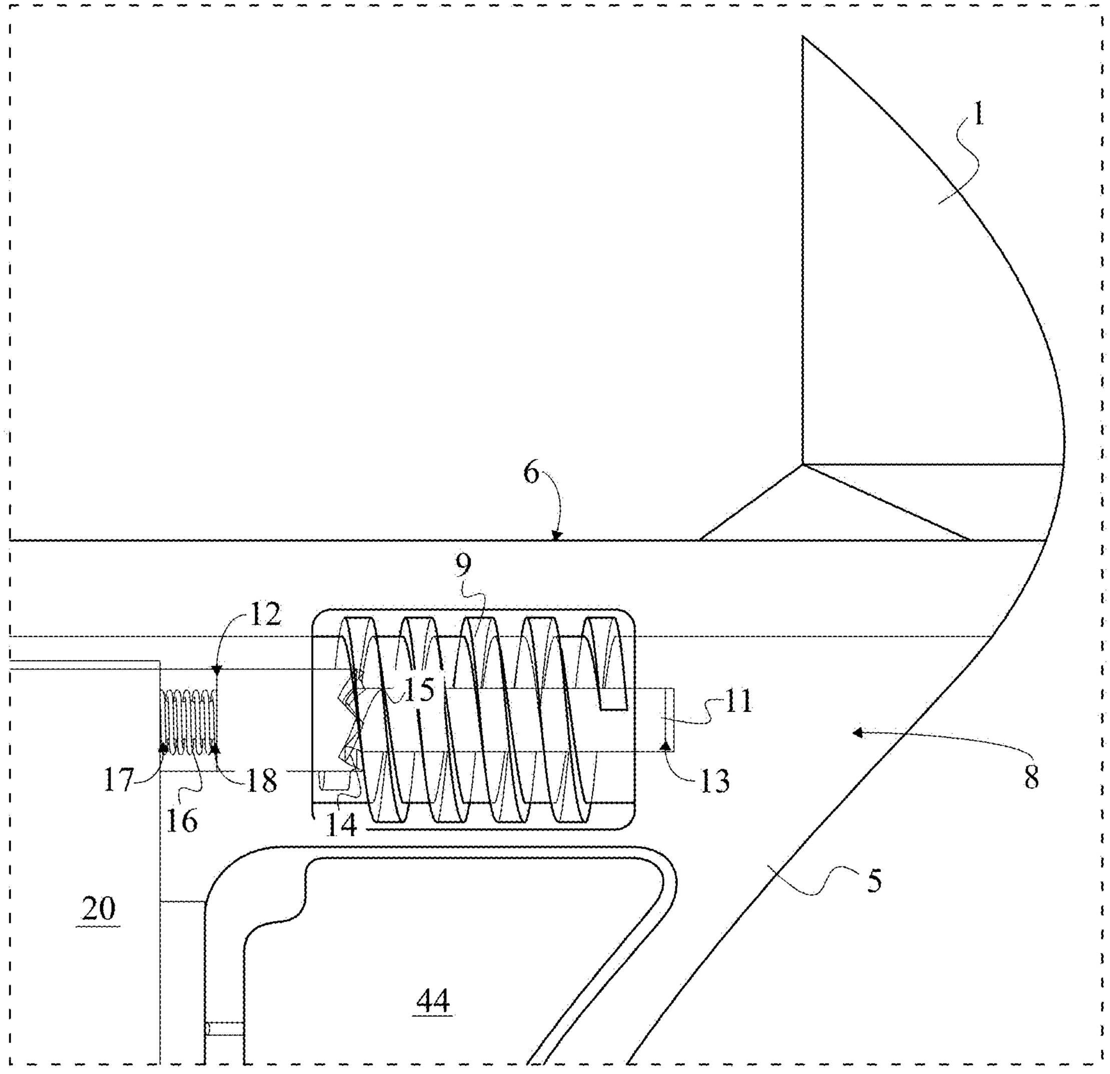
FIG. 23 is a detailed magnified view of the adjustable wrench of the present invention, wherein the adjustable wrench is shown without the limited-release feature.

Further, the spring-loaded clutch 10, the electric motor 20, the controller 37, and the portable power source 38 are mounted within the wrench handle 5 so that the wrench handle 5 retains and protects the electronics, as can be seen in FIGS. 1 through 12. The worm gear 9 is also operatively coupled to the movable jaw 2 to engage the worm gear 9 to the movable jaw 2. The worm gear 9 is used to translate the movable jaw 2 along the proximal handle edge 6 in such a way that the rotation of the worm gear 9 is converted into linear movement of the movable jaw 2. The electric motor 20 is also operatively coupled to the worm gear 9 through the spring-loaded clutch 10 to engage the electric motor 20 to the worm gear 9. The spring-loaded clutch 10 is used to discretely transfer torque generated by the electric motor 20 to the worm gear 9. In other words, the electric motor 20 drives the rotation of the worm gear 9. Furthermore, the controller 37 is electronically connected to the electric motor 20 and the portable power source 38 is electrically connected to the electric motor 20 and the controller 37. For example, the electric motor 20 and the portable power source 38 can be connected to the controller 37 so that the controller 37 can also regulate the current distribution to the various components. Thus, the operation of the electric motor 20 is facilitated by the controller 37 and powered by the portable power source 38. In alternate embodiments, the spring-loaded clutch 10 may be implemented in different configurations that can still engage the electric motor 20, as can be seen in FIG. 22.

As previously discussed, the rotation of the worm gear 9 is converted into the linear movement of the movable jaw 2. For example, the clockwise rotation of the worm gear 9 can move the movable jaw 2 towards the fixed jaw 1, while the counterclockwise rotation of the worm gear 9 can move the movable jaw 2 away from the fixed jaw 1. To do so, the movable jaw 2 may comprise a gear rack 3 and a wrench jaw 4, as can be seen in FIGS. 1 through 12. The gear rack 3 corresponds to the portion of the movable jaw 2 that is engaged to the worm gear 9, while the wrench jaw 4 corresponds to the physical portion of the movable jaw 2 that engages the target fastener or object together with the fixed jaw 1.

In general, the movable jaw 2 can be implemented as follows: the wrench jaw 4 is laterally connected to the gear rack 3 so that the wrench jaw 4 is fixed to the gear rack 3, as can be seen in FIGS. 1 through 12. For example, the wrench jaw 4 can be oriented perpendicular to the gear rack 3 so that the wrench jaw 4 is aligned towards the fixed jaw 1. Further, the wrench jaw 4 is positioned along the gear rack 3. The positioning of the wrench jaw 4 on the gear rack 3 enables the wrench jaw 4 to reach the fixed jaw 1 to accommodate smaller objects. The wrench jaw 4 can also be moved towards the end of the proximal handle edge 6 opposite the fixed jaw 1 to accommodate larger objects. The wrench handle 5 provides a channel adjacent to the proximal handle edge 6 to enable the linear movement of the gear rack 3. Further, the gear rack 3 is slidably connected along the proximal handle edge 6 within the corresponding channel that traverses the wrench handle 5 parallel to the proximal handle edge 6. In addition, the gear rack 3 is positioned parallel to the gear-rotation axis 39 so that the linear movement of the gear rack 3 does not collide with the worm gear 9. Furthermore, the gear rack 3 is engaged to the worm gear 9, opposite to the wrench jaw 4, so that the engagement of the gear rack 3 to the worm gear 9 occurs internally within the wrench handle 5. In other embodiments, the movable jaw 2 can be modified to accommodate different features.

As can be seen in FIGS. 1 through 12, the spring-loaded clutch 10 is designed to facilitate the engagement of the electric motor 20 to the worm gear 9 in such a way that the electric motor 20 can be temporarily disengaged from the worm gear 9 once the necessary clamping force is achieved. In other words, once the target object is securely engaged by the movable jaw 2 and the fixed jaw 1, the electric motor 20 is temporarily disengaged to prevent damage to the electric motor 20 that has not been deactivated yet. To do so, the spring-loaded clutch 10 may comprise a clutch shaft 11, a clutch input feature 14, and a clutch output feature 15. The clutch shaft 11 corresponds to an elongated cylindrical structure that is engaged to the electric motor 20 and accommodates the clutch input feature 14 and also accommodates shaft for the worm gear 9. The clutch input feature 14 and the clutch output feature 15 correspond to two disc-like structures with interlocking teeth that are engaged to each other to transmit the torque generated by the electric motor 20. The interlocking teeth on the clutch input feature 14 and the clutch output feature 15 have appropriately shaped protrusions to create the clutch functionality and allow the disengagement of the clutch input feature 14 from the clutch output feature 15 once the target clamping force is achieved. For example, the shape of the protrusions can include, but is not limited to, a round shape, a trapezoidal shape, a squared shape, a rectangular shape, etc.

In some embodiments, the spring-loaded clutch 10 can be implemented as follows: the clutch input feature 14 is laterally connected around the clutch shaft 11 to make the clutch input feature 14 part of the clutch shaft 11, as can be seen in FIGS. 1 through 12. On the other hand, the clutch output feature 15 is integrated into the worm gear 9 so that the clutch output feature 15 is part of the worm gear 9. Further, the clutch shaft 11, the clutch input feature 14, and the clutch output feature 15 are concentrically positioned with the gear-rotation axis 39. This way, the clutch shaft 11 and both clutch features 14 and 15 rotate on the same rotation axis as the worm gear 9. Further, a motor output shaft 21 of the electric motor 20 is torsionally connected to the clutch shaft 11. The motor output shaft 21 corresponds to an elongated structure part of the electric motor 20 that engages directly to the clutch shaft 11. In addition, the clutch input feature 14 is operatively coupled to the clutch output feature 15 to transmit the torque generated by the electric motor 20 from the motor output shaft 21, through the clutch shaft 11, and to the worm gear 9. The clutch input feature 14 selectively disengages from the clutch output feature 15 as a rotational resistance is felt by the worm gear 9. As a result, the electric motor 20 can continuously generate torque to rotate the worm gear 9 to have the movable jaw 2 and the fixed jaw 1 fully engage the target object without damaging the motorized worm screw 8.

Different mechanisms can be used to stop the electric motor 20 once the clutch input feature 14 disengages from the clutch output feature 15 while the electric motor 20 is running. For example, if the user is manually activating the electric motor 20, an alarm can be activated to let the user know that the appropriate clamping force has been achieved. A feedback system can also be implemented that automatically deactivates the electric motor 20 once the appropriate clamping force has been achieved. For example, a control button or limit switch can be implemented that trigger an alarm to alert the user once the appropriate clamping force is achieved. In other embodiments, different control systems for the motorized worm screw 8 can be implemented to prevent damage to the motor components.

In some embodiments, to facilitate the engagement and disengagement of the spring-loaded clutch 10, the spring-loaded clutch 10 may further comprise a clutch compression spring 16 and an anchor plate 19, as can be seen in FIGS. 8 through 12. The clutch compression spring 16 forces the clutch input feature 14 to engage with the clutch output feature 15 and to disengage when rotational resistance is felt by the worm gear 9. The anchor plate 19 provides structural support to the clutch compression spring 16 so that the clutch compression spring 16 can force the clutch input feature 14 towards the clutch output feature 15. Further, the clutch shaft 11 comprises a first shaft end 12 and a second shaft end 13 corresponding to the terminal ends of the clutch shaft 11. Similarly, the clutch compression spring 16 comprises a first spring end 17 and a second spring end 18 comprising to the terminal ends of the clutch compression spring 16.

In some embodiments, the anchor plate 19 is mounted within the wrench handle 5 so that the anchor plate 19 is secured within the wrench handle 5 to provide the appropriate structural support, as can be seen in FIGS. 8 through 12. The first spring end 17 is pressed against the anchor plate 19 so that the anchor plate 19 blocks the movement of the clutch compression spring 16 away from the worm gear 9. On the other hand, the second spring end 18 is pressed against the first shaft end 12 to push the clutch input feature 14 towards the clutch output feature 15. Further, the motor output shaft 21 of the electric motor 20 traversing through the anchor plate 19 and through the clutch compression spring 16 so that the rotation of the motor output shaft 21 is not blocked by the anchor plate 19 nor the clutch compression spring 16. The motor output shaft 21 is torsionally connected to the first shaft end 12 to engage the motor output shaft 21 to the clutch shaft 11. The clutch shaft 11 is also rotatably mounted into the worm gear 9 to transmit the torque from the motor output shaft 21 to the worm gear 9. The clutch shaft 11 can also serve as the shaft for the worm gear 9. Furthermore, the second shaft end 13 is positioned within the worm gear 9 to facilitate the engagement of the clutch input feature 14 with the clutch output feature 15. Further, once assembled, the second shaft end 13 can traverse through the worm gear 9 and into a corresponding slot within the wrench handle 5 to facilitate the use of the clutch shaft 11 as the shaft for the worm gear 9. In other embodiments, the outer housing of the gearbox 23 can serve the same function as the anchor plate 19, as can be seen in FIGS. 2, 3, and 13 through 15.

In some embodiments, the present invention may further comprise a limited-release feature 26, as can be seen in FIGS. 1 through 12. The limited-release feature 26 enables the temporary disengagement of the worm gear 9 to loosen the worm gear 9 from a jammed configuration. In fact the limited-release feature 26 allows the worm gear 9 to move linearly for a limited course of travel once the user engages the limited-release feature 26. To do so, the limited-release feature 26 is operatively integrated in between the spring-loaded clutch 10 and the worm gear 9, as can be seen in FIGS. 1 through 12. The limited-release feature 26 is used to allow the limited linear movement of the worm gear 9 along the gear-rotation axis 39 to release the moveable jaw 2 from a clamped position. In other words, the limited-release feature 26 allows the worm gear 9 to loosen when the worm gear 9 gets locked once the fixed jaw 1 and the moveable jaw 2 are clamped onto the engaged fastener. The linear movement of the worm gear 9 allows the moveable jaw 2 to move away from the fixed jaw 1 to unclamp the engaged fastener.

In some embodiments, the limited-release feature 26 may comprise a wave spring 27 and a tubular body 28, as can be seen in FIGS. 8 through 15 and 20 through 22. The tubular body 28 corresponds to a cylindrical structure that facilitates the engagement of the limited-release feature 26. The wave spring 27 enables the tubular body 28 to move along the gear-rotation axis 39 once the limited-release feature 26 is used. Further, the tubular body 28 comprises a first body base 29 and a second body base 30 corresponding to the cylindrical bases of the tubular body 28. In alternate embodiments, the wave spring 27 can be replaced with other suitable springs.

To implement the limited-release feature 26, the wave spring 27 is positioned in between the anchor plate 19 and the first body base 29 so that wave spring 27 is structurally supported by the anchor plate 19, as can be seen in FIGS. 8 through 12. The wave spring 27 is also positioned around the first spring end 17 so that the wave spring 27 securely engages the tubular body 28. In addition, the clutch compression spring 16 is positioned through the tubular body 28 so that the operation of the clutch compression spring 16 is not limited by the tubular body 28. Further, the first shaft end 12 is rotatably mounted into the second body base 30 so that the rotation and linear movement of the clutch shaft 11 is not obstructed by the tubular body 28.

The limited-release feature 26 is preferably a mechanism that can be manually engaged by the user to loosen the worm gear 9 from a jammed configuration and/or when the user wants to use the limited-release feature 26 to move the movable jaw during operation. To do so, the limited-release feature 26 may further comprise a spring-loaded pin 31, a lock ball 32, a ball setting 33, and a lock receiver 34, as can be seen in FIGS. 1 through 15. The spring-loaded pin 31 enables the user to manually engage the limited-release feature 26. The lock ball 32, the ball setting 33, and the lock receiver 34 enable the engagement of the spring-loaded pin 31 to the tubular body 28. The lock receiver 34 is designed to facilitate the setting of two configurations of the limited-release feature 26. So, the lock receiver 34 comprises a first ball recession 35 and a second ball recession 36 that allow the lock ball 32 to move between the tubular body 28 and the spring-loaded pin 31 to set the different configurations.

To implement the spring-loaded pin 31, the spring-loaded pin 31 is mounted into the wrench handle 5 to secure the spring-loaded pin 31 to the wrench handle 5, as can be seen in FIGS. 1 through 15. The body of the spring-loaded pin 31 is a cylindrical body with a corresponding compression spring. The wrench handle 5 can include a pin slot that accommodates the operation of the spring-loaded pin 31. The pin slot is designed so a portion of the spring-loaded pin 31 can protrude out of the wrench handle 5. The corresponding compression spring maintains the spring-loaded pin 31 pushed out so that the portion of the spring-loaded pin 31 protrudes out of the wrench handle 5, which is the resting configuration of the spring-loaded pin 31. The user can manually push the spring-loaded pin 31 into the wrench handle 5, and once the user releases the spring-loaded pin 31, the corresponding compression spring returns the spring-loaded pin 31 to the resting configuration.

Further, the first ball recession 35 and the second ball recession 36 laterally traverse into the spring-loaded pin 31 to make both ball recessions part of the body of the spring-loaded pin 31, as can be seen in FIGS. 1 through 15. The first ball recession 35 and the second ball recession 36 are positioned adjacent to each other and arranged in a linear manner so that lock ball 32 can be moved between the first ball recession 35 and the second ball recession 36. In addition, the depth of the first ball recession 35 is smaller than the depth of the second ball recession 36. This allows the lock ball 32 to rest on the spring-loaded pin 31 at different depths depending on which ball recession the lock ball 32 is positioned. On the other hand, the ball setting 33 is laterally integrated into the tubular body 28 so that the ball setting 33 is part of the tubular body 28. The ball setting 33 is positioned adjacent to the first ball recession 35 and the second ball recession 36. This way, the lock ball 32 can be rollably mounted into the ball setting 33 while being able to engage the first ball recession 35 or the second ball recession 36.

Figure 20:
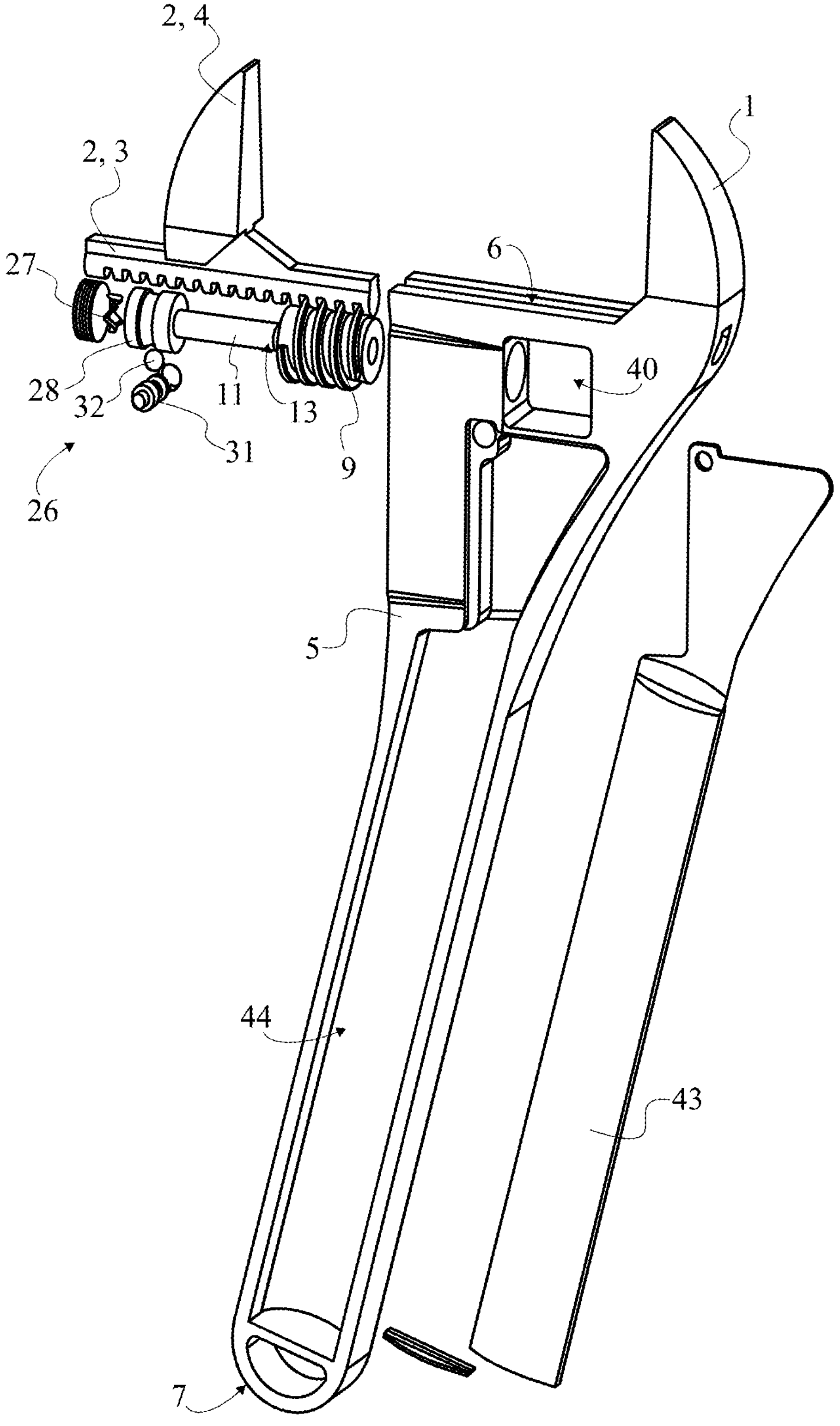
FIG. 20 is a detailed exploded perspective view of the third embodiment of the adjustable wrench of the present invention.
Figure 21:
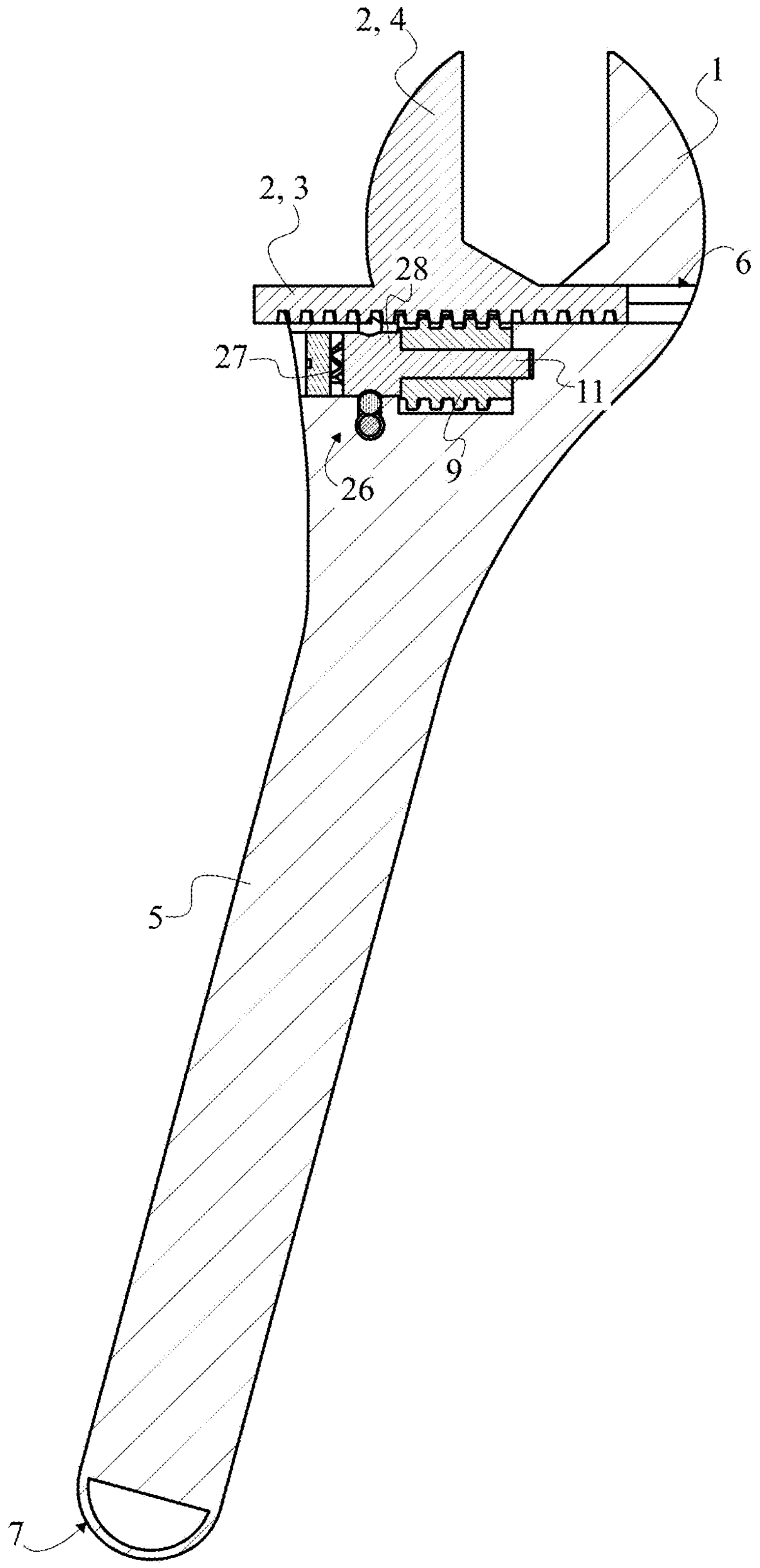
FIG. 21 is a schematic view of the third embodiment of the adjustable wrench of the present invention.

Further, the lock ball 32 is operatively coupled to the lock receiver 34 to facilitate the limited linear movement of the worm gear 9 along the gear-rotation axis 39 when the limited-release feature 26 is engaged, as can be seen in FIGS. 1 through 15. The spring-loaded pin 31 and the tubular body 28 are arranged so when the spring-loaded pin 31 is in the resting configuration, the worm gear 9 cannot linearly move along the gear-rotation axis 39. In the resting configuration, the lock ball 32 is engaged into the first ball recession 35 so that the lock ball 32 fully engages the ball setting 33. On the other hand, when the user pushes the spring-loaded pin 31 into the wrench handle 5, the lock ball 32 is moved from the first ball recession 35 to the second ball recession 36. Since the second ball recession 36 has greater depth, the lock ball 32 partially disengages from the ball setting 33 which gives space for the worm gear 9 to linearly move along the gear-rotation axis 39. In other embodiments, different mechanisms can be implemented for the limited-release feature 26 that allows the user to release the worm gear 9 from a jammed configuration by allowing the worm gear 9 to move linearly in line with the gear-rotation axis 39. As can be seen in FIGS. 20 and 21, the quick-release feature 26 may be implemented without the implementation of the spring-loaded clutch 10 nor the electric motor 20.

As previously discussed, the electric motor 20 of the present invention is designed to output the appropriate power and speed to rotate the worm gear 9 which results in the linear movement of the movable jaw 2. In general, the electric motor 20 may further comprise a rotor 22, a gearbox 23, and a stator 24, as can be seen in FIGS. 1 through 15. The rotor 22 corresponds to the rotating part of the electric motor 20, while the stator 24 corresponds to the fixed part of the electric motor 20 that is mounted within the wrench handle 5. The gearbox 23 is designed to transmit the generated torque from the rotor 22 to the motor output shaft 21. The gearbox 23 can also be configured to increase or lower the transmitted torque as necessary while preventing operational damage to the motor components.

In general, the electric motor 20 can be configured as follows: the stator 24 is mounted within the wrench handle 5 to secure the electric motor 20 within the wrench handle 5, as can be seen in FIGS. 1 through 15. The motor output shaft 21 is oriented perpendicular to a motor-rotation axis 25 of the rotor 22 to allow the motor output shaft 21 to be aligned with the gear-rotation axis 39. This arrangement also allows the electric motor 20 to have better specs without increasing the size of the wrench handle 5. Further, the rotor 22 is operatively coupled to the motor output shaft 21 through the gearbox 23, wherein the gearbox 23 is used to transfer torque from the rotor 22 to the motor output shaft 21. In other words, the rotor 22 is connected to the motor output shaft 21 through the various gears of the gearbox 23 to facilitate the safe and efficient transmission of the torque generated. In other embodiments, the electric motor 20 can be modified to accommodate different operational specifications.

While the adjustable wrench of the present invention is motorized, the present invention also facilitates the manual operating of the worm gear 9 in all conditions including a jammed configuration. The present invention further comprise a worm hole 40 that forms a window-like opening on the wrench handle 5, as can be seen in FIGS. 1 through 15. To do so, the worm hole 40 traverses through the wrench handle 5, adjacent to the proximal handle edge 6, to form a space large enough to accommodate the worm gear 9 as well as the limited linear movement of the worm gear 9 when the limited-release feature 26 is used. In addition, the worm gear 9 is rotatably mounted through the worm hole 40 to position the worm gear 9 within the worm hole 40. This way, the user can manually rotate the worm gear 9 anytime, including after engaging the limited-release feature 26 to release the worm gear 9 from the jammed configuration for uninterrupted use.

The present invention provides various features that allow the user to configure or perform maintenance on the motorized worm screw 8. In some embodiments, the present invention may further comprise a motor hatch 41 and a motor access hole 42 that give access to the electric motor 20, as can be seen in FIGS. 1 through 15. To do so, the motor access hole 42 traverses into the wrench handle 5, adjacent to the electric motor 20, to form a space large enough through which the electric motor 20 can be accessed. The motor hatch 41 is mounted onto the wrench handle 5 and positioned across the motor access hole 42 to cover the motor access hole 42. This way, the user can access the electric motor 20 for maintenance by removing the motor hatch 41 and exposing the motor access hole 42.

In the preferred embodiment, a motor compression spring 50 is implemented to further secure motorized worm screw 8 by pressing the electric motor 20 against the assembly. To do so, the motor compression spring 50 is pressed in between the motor hatch 41 and the electric motor 20. This way, the motor compression spring 50 pushes the electric motor 20 towards the motorized worm screw 8 and allows the electric motor 20 to be pressed back against the motor hatch 41 when the spring-loaded clutch 10 finds resistance momentarily. The motor compression spring 50 can be secured to the motor hatch 41 and/or the housing of the electric motor 20 to keep the motor compression spring 50. In other embodiments, different elastic features can be implemented to help provide the same spring-load effect for the electric motor 20.

Similar to the motor hatch 41, the present invention may further comprise a battery hatch 43 and a battery access hole 44 that give access to the portable power source 38 for maintenance or other purposes such as storing small objects like fasteners, as can be seen in FIGS. 1 through 15. For example, if the portable power source 38 is provided as a replaceable battery, the battery hatch 43 allows the user to replace the battery. To do so, the motor access hole 42 traverses into the wrench handle 5, adjacent to the portable power source 38, to form a space large enough through which the portable power source 38 can be accessed. The battery hatch 43 is mounted onto the wrench handle 5 and positioned across the battery access hole 44 to cover the battery access hole 44. This way, the user can access the portable power source 38 by removing the battery hatch 43 and exposing the battery access hole 44.

Figure 7:
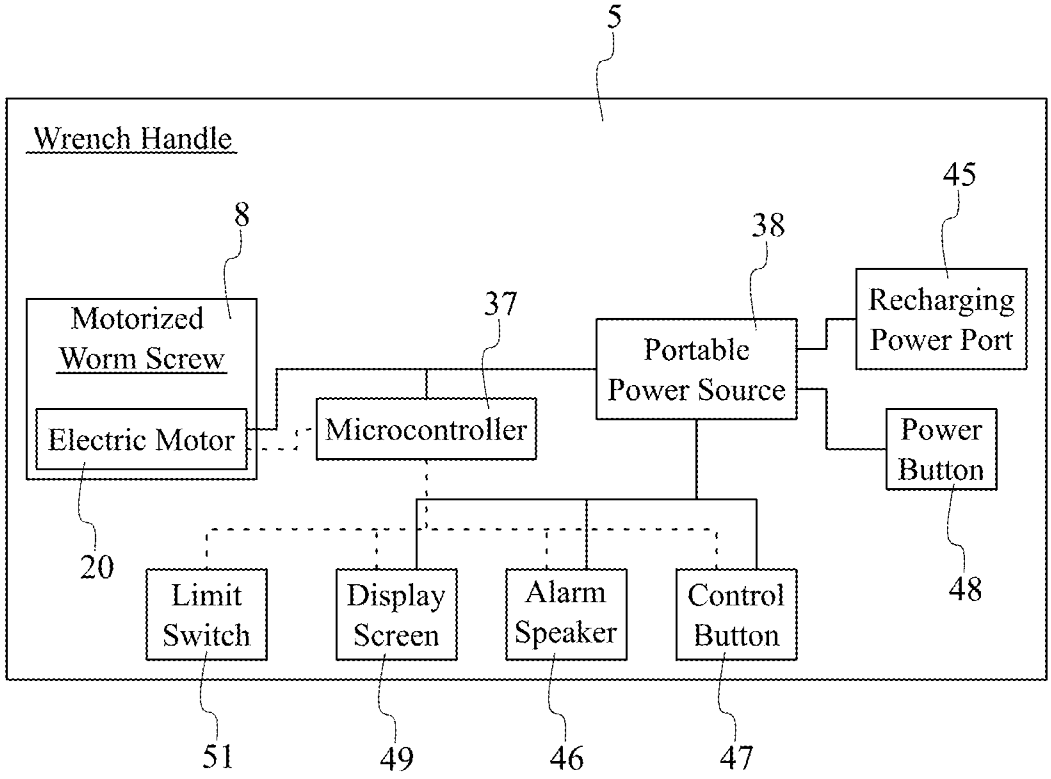
FIG. 7 is a box diagram showing the electrical connections and the electronic connections of the present invention, wherein the electrical connections are shown in solid lines, and wherein the electronic connections are shown in dashed lines.
Figure 8:
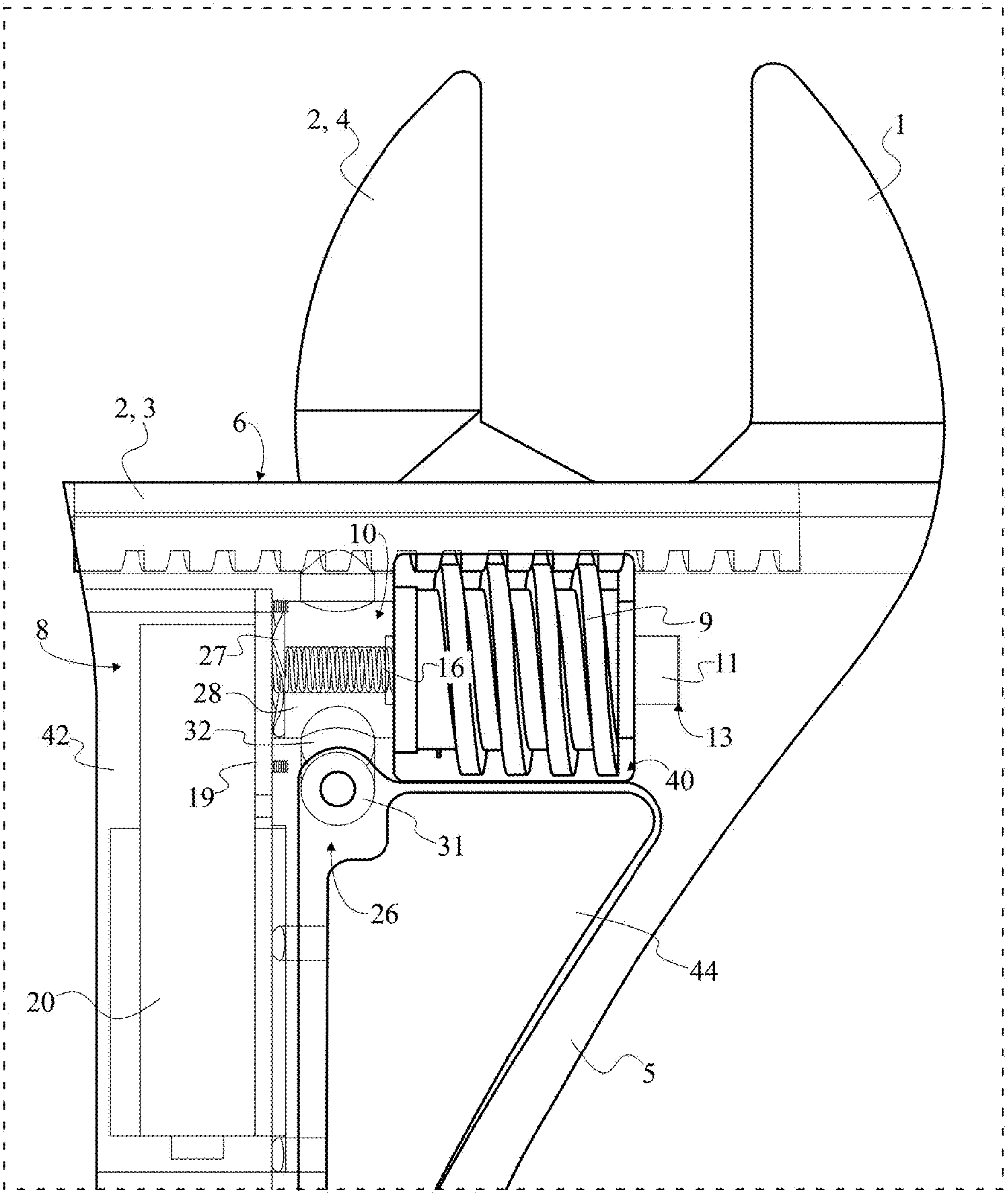
FIG. 8 is a detailed front view of the first embodiment of the adjustable wrench of the present invention.
Figure 9:
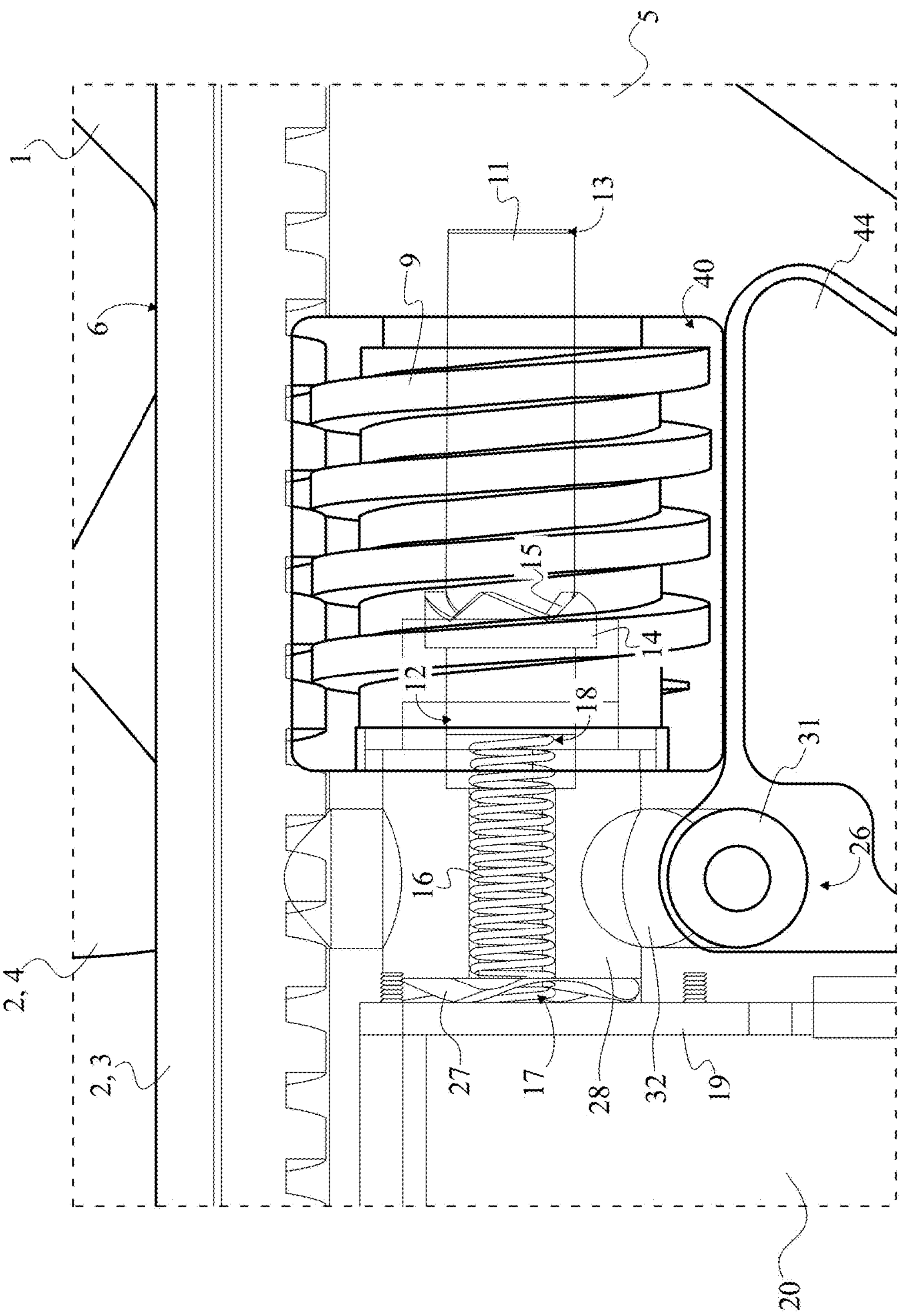
FIG. 9 is a detailed magnified view of the first embodiment of the adjustable wrench of the present invention.
Figure 10:
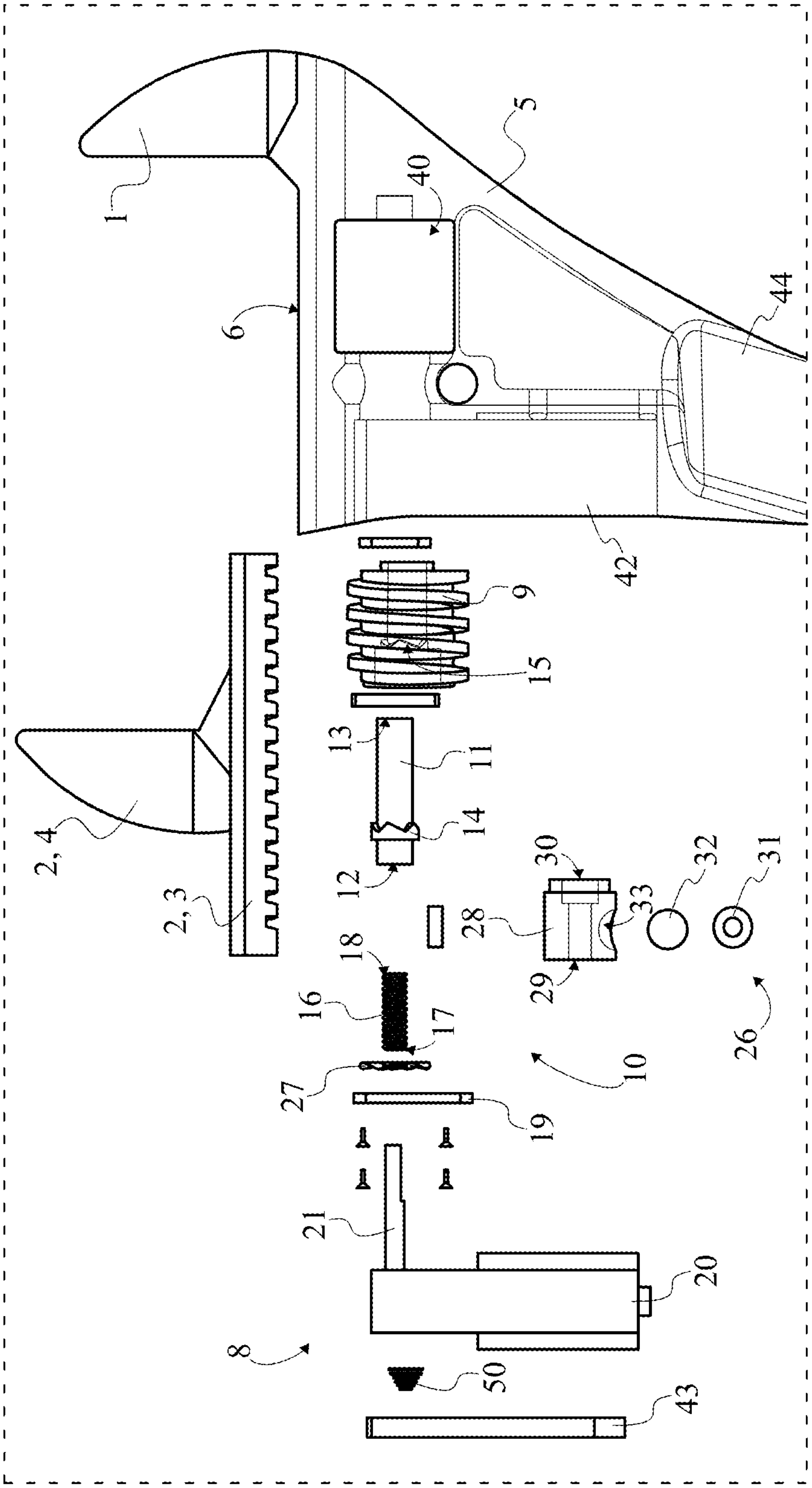
FIG. 10 is a front exploded view of the first embodiment of the adjustable wrench of the present invention.
Figure 11:
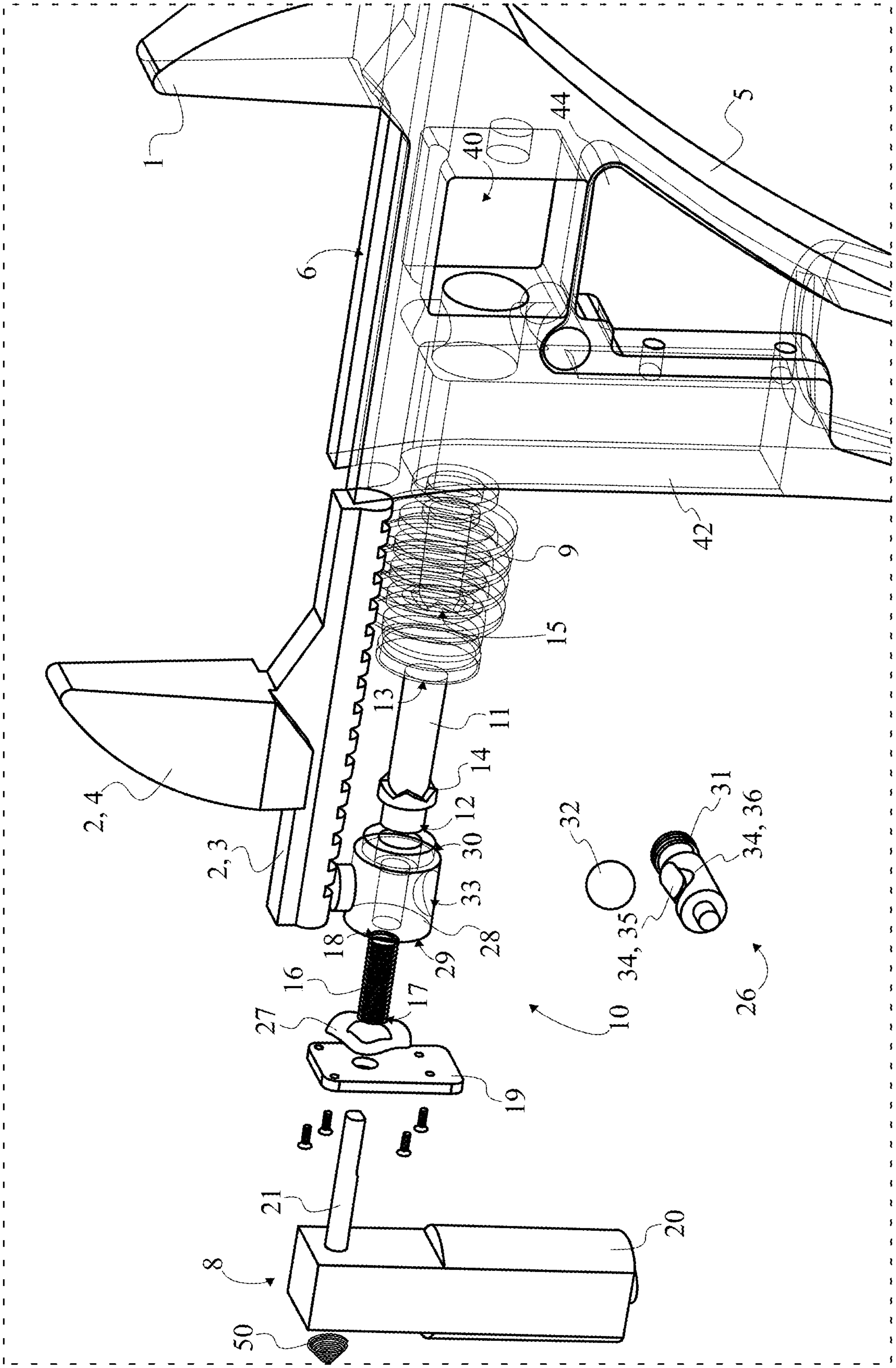
FIG. 11 is a detailed exploded perspective view of the first embodiment of the adjustable wrench of the present invention.
Figure 12:
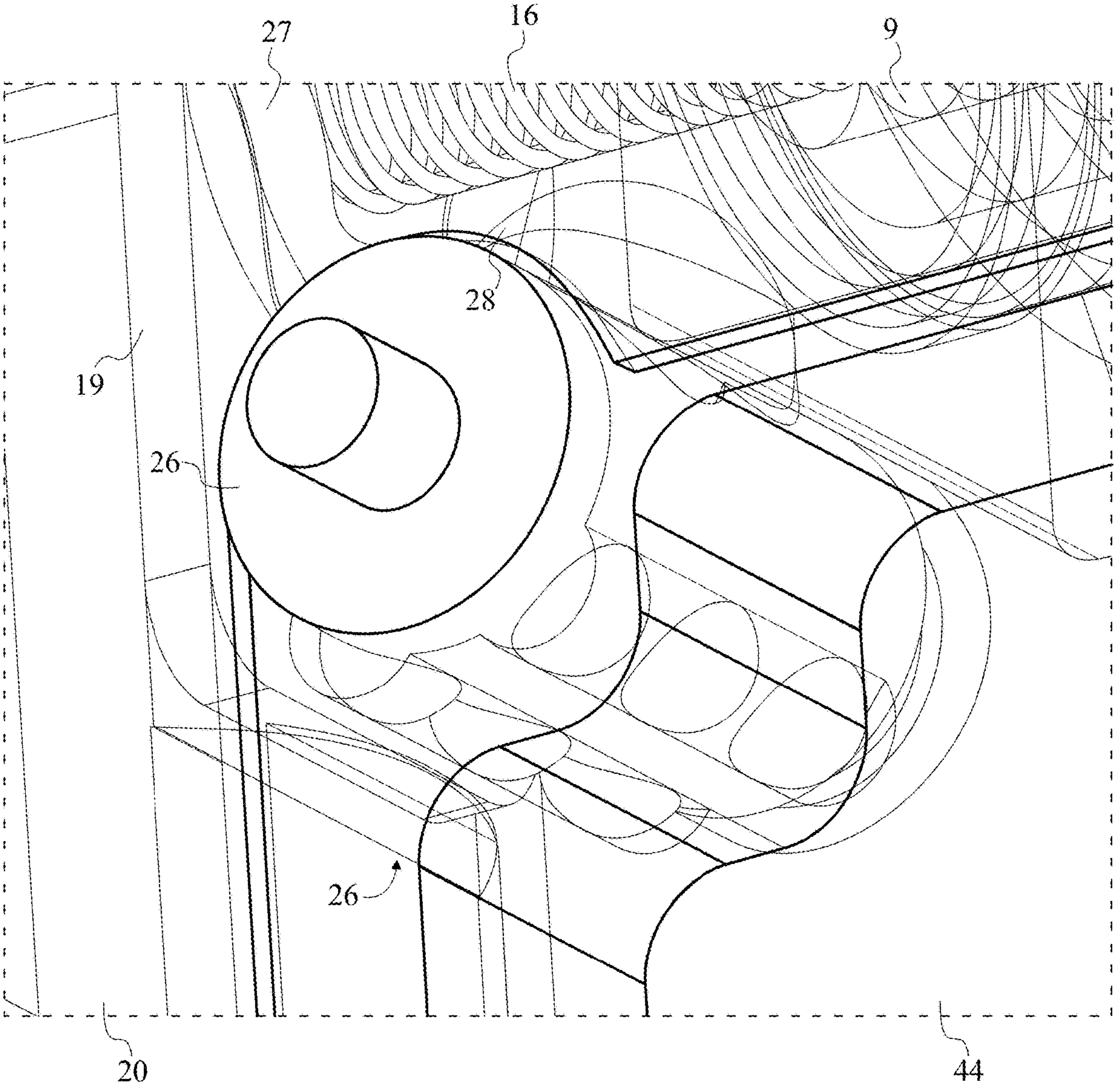
FIG. 12 is a detailed magnified view of an alternate embodiment of the spring-loaded pin of the limited-release feature of the present invention.
Figure 13:
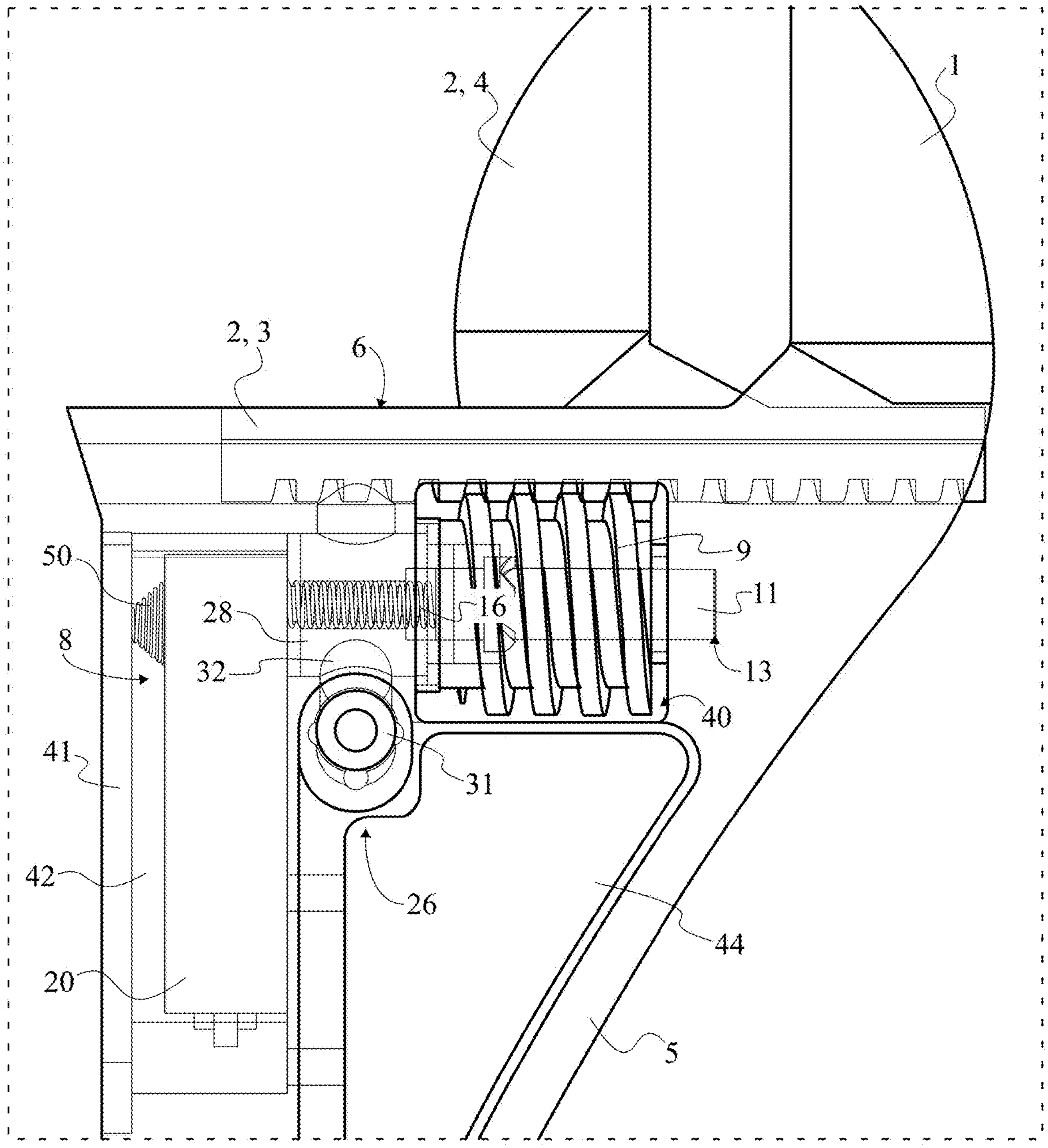
FIG. 13 is a detailed front view of the second embodiment of the adjustable wrench of the present invention.
Figure 14:
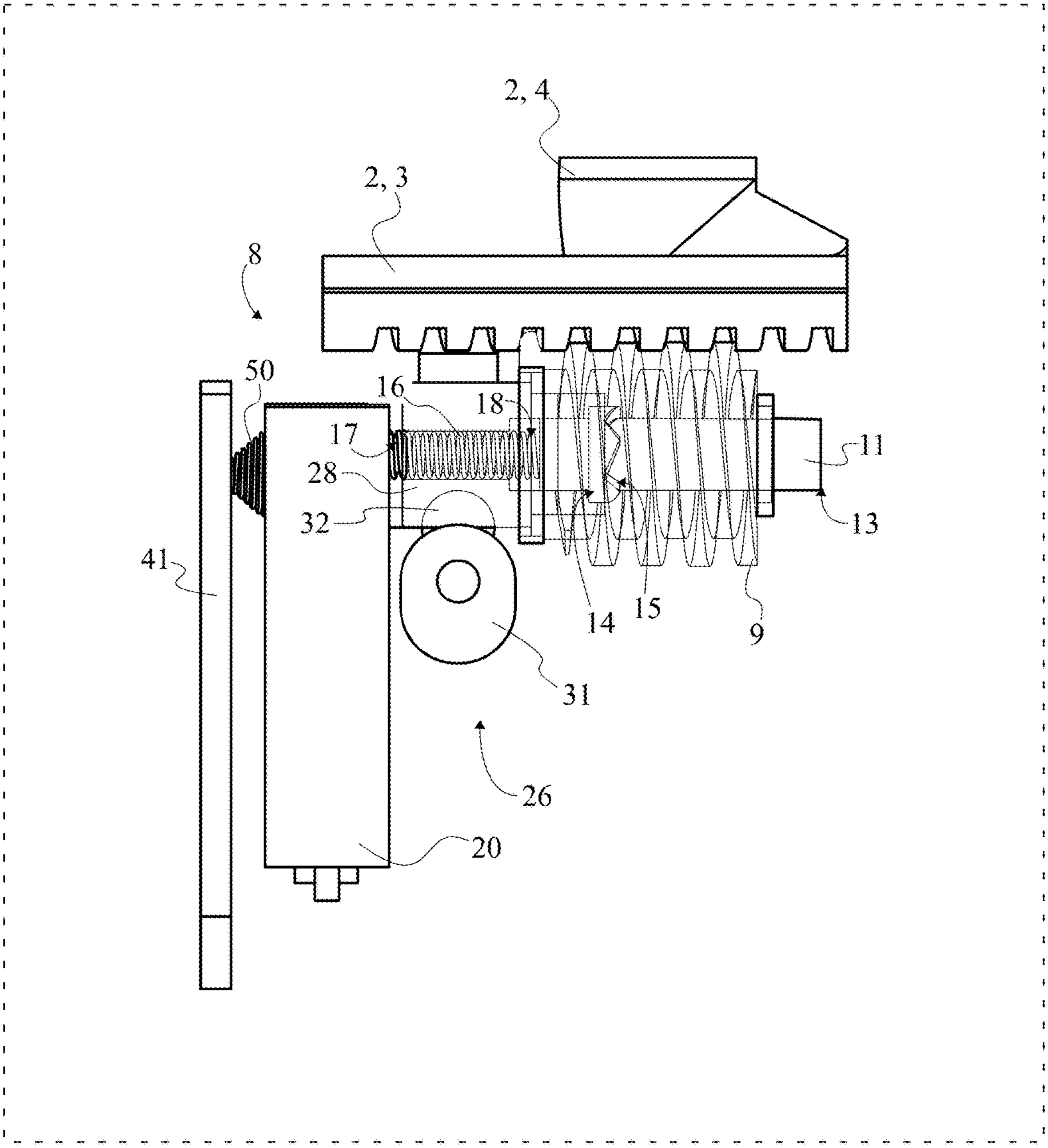
FIG. 14 is a magnified front view of the motorized worm screw, clutch and limited release feature of the second embodiment of the adjustable wrench of the present invention.
Figure 15:
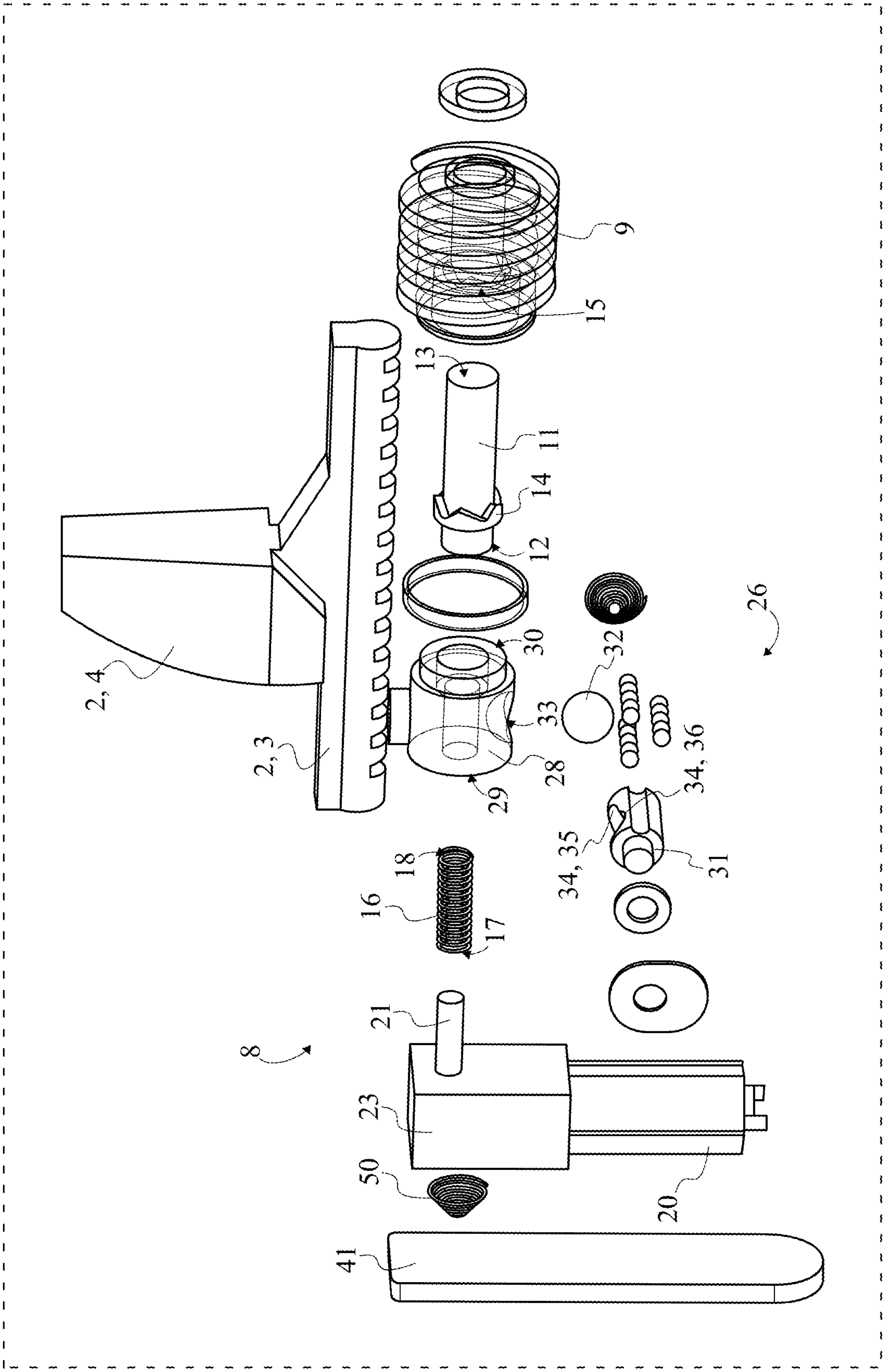
FIG. 15 is a detailed exploded perspective view of the motorized worm screw clutch and limited release feature of the second embodiment of the adjustable wrench of the present invention.

The portable power source 38 can also be provided as a rechargeable battery that can be recharged using an external power source. To enable the recharging of the portable power source 38, the present invention may further comprise a recharging power port 45 that allows the portable power source 38 to be electrically connected to an external power source, as can be seen in FIG. 7. To do so, the recharging power port 45 is integrated into the wrench handle 5 to make the recharging power port 45 externally accessible. In addition, the recharging power port 45 is electrically connected to the portable power source 38 to enable the transmission of electricity from the external power source to the portable power source 38 for recharging. For example, the recharging power port 45 can be connected to the portable power source 38 via the controller 37 so that the controller 37 acts as a Battery Management System (BMS) to charge the portable power source 38. BMS is used to ensure the safety of the portable power source 38 during charging and discharging is guaranteed.

As previously discussed, the present invention can implement different operational features that help the user to safely and efficiently operate the adjustable wrench. In some embodiments, the present invention may further comprise an alarm speaker 46 that emits a sound to alert the user when the appropriate clamping force is achieved using the movable jaw 2 and the fixed jaw 1, as can be seen in FIG. 7. To do so, the alarm speaker 46 is integrated into the wrench handle 5 so that the alarm speaker 46 can emit the sound alert. The alarm speaker 46 is also electronically connected to the controller 37 so that the alarm speaker 46 is activated according to the operational signals from the controller 37. Further, the alarm speaker 46 is electrically connected to the portable power source 38 to provide the electrical power necessary for the alarm speaker 46. The alarm speaker 46 can be connected to the portable power source 38 via the controller 37 as well.

Different ways can be implemented to enable the automatic activation of the alarm speaker 46. For example, a sensor or switch can be implemented to track and sense the electric motor 20 and clutch activation. In the preferred embodiment, a limit switch 51 is implemented that physically touches the electric motor 20 so that the limit switch 51 generates a feedback signal that is transmitted to the controller 37 for processing. The limit switch 51 is mounted within the wrench handle 5 to secure the limit switch 51 adjacent to a section of the housing of the electric motor 20, preferably offset the motor output shaft 21. In addition, the limit switch 51 is operatively coupled with the electric motor 20 in such a way that movement of the electric motor 20 actuates the limit switch 51. The limit switch 51 is set to directly activate the alarm speaker 46 so that the user can be signaled to stop operating the electric motor 20. Alternatively, the limit switch 51 can be arranged to facilitate the automatic deactivation of the electric motor 20. For example, when limit switch 51 is actuated and the feedback signal is received and processed by the controller 37, the controller 37 can deactivate the electric motor 20 to prevent damage to the motor components. In other embodiments, different feedback mechanisms can be implemented to automatically or manually deactivate the electric motor 20.

In addition to the alarm speaker 46, the present invention may further comprise at least one control button 47 that allows the user to selectively engage the electric motor 20, as can be seen in FIGS. 1 through 7. To do so, the at least one control button 47 is integrated into the wrench handle 5 so that the at least one control button 47 can be externally accessible to the user. The at least one control button 47 is electronically connected to the controller 37 to transmit the operational signals from the at least one control button 47 to the controller 37. In addition, the at least one control button 47 is electrically connected to the portable power source 38 to manage the electricity flow from the portable power source 38.

In some embodiments, several control buttons can be implemented, each overseeing a different operational aspect of the electric motor 20. In the preferred embodiment, one control button can be implemented to move the movable jaw 2 away from the fixed jaw 1 (i.e., open the jaws). Another control button can be implemented to move the movable jaw 2 towards the fixed jaw 1 (i.e., close the jaws). Further, the control buttons can be implemented as tactile switches so that electric motor 20 remains in operation as long as the user is pressing a control button. Once the user releases the pressed control button, the electric motor 20 stops. Furthermore, the at least one control button 47 can be different types of physical switches including, but not limited to, SPDT, tactile, slide, toggle, joystick, etc.

To further enable the user to selectively activate the adjustable wrench, the present invention may further comprise a power button 48, as can be seen in FIG. 7. The power button 48 can be a normal physical button that can be pressed to turn the electric motor 20 on and pressed again to turn the electric motor 20 off. To implement the power button 48, the power button 48 is integrated into the wrench handle 5 so that the power button 48 can be externally accessible to the user. The power button 48 is also electronically connected to the controller 37 to control the electricity flow from the portable power source 38 to the electric motor 20.

Further, to help the user monitor the operation of the adjustable wrench, the present invention may further comprise a display screen 49, as can be seen in FIGS. 1 through 7. The display screen 49 is a small display that outputs different information about the operation of the present invention. For example, the display screen 49 can output the current charge level of the portable power source 38, the operation conditions of the electric motor 20, etc. To implement the display screen 49, the display screen 49 is integrated into the wrench handle 5 so that the display screen 49 is visible from the outside of the wrench handle 5. The display screen 49 is also electronically connected to the controller 37 to enable the transmission of electronic signals from the controller 37 to the display screen 49. The display screen 49 is also electrically connected to the portable power source 38 to provide the electrical power necessary for the operation of the display screen 49. Similarly, the display screen 49 can be connected to the portable power source 38 via the controller 37 to regulate the current to the display screen 49. In an alternate embodiment, the display screen 49 can be replaced with other visual indicators, such as a light indicator, to visually indicate the charge level of the portable power source 38. In other embodiments, different operational features can be implemented on the adjustable wrench.

Although the invention has been explained in relation to its preferred embodiments, it is to be understood that many other possible modifications and variations can be made without departing from the spirit and scope of the invention.

What is claimed is:

1. An adjustable wrench with an integrated clutch comprising:

a fixed jaw;

a movable jaw;

a wrench handle;

a motorized worm screw;

a controller;

a portable power source;

the wrench handle comprising a proximal handle edge and a distal handle end;

the motorized worm screw comprising a worm gear, a spring-loaded clutch, and an electric motor;

the spring-loaded clutch comprising a clutch shaft, a clutch compression spring, and an anchor plate;

the clutch shaft comprising a first shaft end and a second shaft end;

the clutch compression spring comprising a first spring end and a second spring end;

the proximal handle edge and the distal handle end being positioned opposite to each other along the wrench handle;

the fixed jaw being terminally connected to the proximal handle edge;

the movable jaw being slidably mounted along the proximal handle edge;

the worm gear being rotatably mounted through the wrench handle about a gear-rotation axis, adjacent to the proximal handle edge;

the spring-loaded clutch, the electric motor, the controller, and the portable power source being mounted within the wrench handle;

the worm gear being operatively coupled to the movable jaw, wherein the worm gear is used to translate the movable jaw along the proximal handle edge;

the electric motor being operatively coupled to the worm gear through the spring-loaded clutch, wherein the spring-loaded clutch is used to discretely transfer torque generated by the electric motor to the worm gear;

the controller being electronically connected to the electric motor; and the portable power source being electrically connected to the electric motor and the controller;

the anchor plate being mounted within the wrench handle;

the first spring end being pressed against the anchor plate;

the second spring end being pressed against the first shaft end;

a motor output shaft of the electric motor traversing through the anchor plate and through the clutch compression spring;

the motor output shaft being torsionally connected to the first shaft end;

the clutch shaft being rotatably mounted into the worm gear; and the second shaft end being positioned within the worm gear.

2. The adjustable wrench with an integrated clutch as claimed in claim 1 further comprising:

the movable jaw comprising a gear rack and a wrench jaw;

the wrench jaw being laterally connected to the gear rack;

the wrench jaw being positioned along the gear rack;

the gear rack being slidably connected along the proximal handle edge;

the gear rack being positioned parallel to the gear-rotation axis; and the gear rack being engaged to the worm gear, opposite to the wrench jaw.

3. The adjustable wrench with an integrated clutch as claimed in claim 1 further comprising:

the spring-loaded clutch comprising a clutch shaft, a clutch input feature, and a clutch output feature;

the clutch input feature being laterally connected around the clutch shaft;

the clutch output feature being integrated into the worm gear;

the clutch shaft, the clutch input feature, and the clutch output feature being concentrically positioned with the gear-rotation axis;

a motor output shaft of the electric motor being torsionally connected to the clutch shaft; and the clutch input feature being operatively coupled to the clutch output feature, wherein the clutch input feature is used to selectively disengage from the clutch output feature as a rotational resistance is felt by the worm gear.

4. The adjustable wrench with an integrated clutch as claimed in claim 1 further comprising:

a limited-release feature; and the limited-release feature being operatively integrated in between the spring-loaded clutch and the worm gear, wherein the limited-release feature is used to allow a limited linear movement of the worm gear along the gear-rotation axis to release the moveable jaw from a jammed configuration.

5. The adjustable wrench with an integrated clutch as claimed in claim 4 further comprising:

the limited-release feature comprising a feature spring and a tubular body;

the tubular body comprising a first body base and a second body base;

the feature spring being positioned in between the anchor plate and the first body base;

the feature spring being positioned around the first spring end;

the clutch compression spring being positioned through the tubular body; and the first shaft end being rotatably mounted into the second body base.

6. The adjustable wrench with an integrated clutch as claimed in claim 5 further comprising:

the limited-release feature further comprising a spring-loaded pin, a lock ball, a ball setting, and a lock receiver;

the lock receiver comprising a first ball recession and a second ball recession;

the spring-loaded pin being mounted into the wrench handle;

the first ball recession and the second ball recession laterally traversing into the spring-loaded pin;

the first ball recession and the second ball recession being positioned adjacent to each other;

a depth of the first ball recession being smaller than a depth of the second ball recession;

the ball setting being laterally integrated into the tubular body;

the lock ball being rollably mounted into the ball setting; and the lock ball being operatively coupled to the lock receiver, wherein the lock ball is engaged into the first ball recession to prevent the limited linear movement of the worm gear along the gear-rotation axis, and wherein the lock ball is engaged into the second ball recession in order to allow the limited linear movement of the worm gear along the gear-rotation axis.

7. The adjustable wrench with an integrated clutch as claimed in claim 1 further comprising:

the electric motor comprising a motor output shaft, a rotor, a gearbox, and a stator;

the stator being mounted within the wrench handle;

the motor output shaft being oriented perpendicular to a motor-rotation axis of the rotor; and the rotor being operatively coupled to the motor output shaft through the gearbox, wherein the gearbox is used to transfer torque from the rotor to the motor output shaft.

8. The adjustable wrench with an integrated clutch as claimed in claim 1 further comprising:

a worm hole;

the worm hole traversing through the wrench handle, adjacent to the proximal handle edge; and the worm gear being rotatably mounted through the worm hole.

9. The adjustable wrench with an integrated clutch as claimed in claim 1 further comprising:

a motor hatch;
a motor access hole;
the motor access hole traversing into the wrench handle, adjacent to the electric motor;
the motor hatch being mounted onto the wrench handle; and
the motor hatch being positioned across the motor access hole.

10. The adjustable wrench with an integrated clutch as claimed in claim 9 further comprising:
a motor compression spring; and
the motor compression spring being pressed in between the motor hatch and the electric motor.

11. The adjustable wrench with an integrated clutch as claimed in claim 10 further comprising:
a limit switch;
the limit switch being mounted within the wrench handle;
the limit switch being operatively coupled with the electric motor, wherein abnormal rotational/axial/radial movements by the electric motor are used to actuate the limit switch; and
the limit switch being electronically connected to the controller.

12. The adjustable wrench with an integrated clutch as claimed in claim 1 further comprising:
a battery hatch;
a battery access hole;
the battery access hole traversing into the wrench handle, adjacent to the portable power source;
the battery hatch being mounted onto the wrench handle; and
the battery hatch being positioned across the battery access hole.

13. The adjustable wrench with an integrated clutch as claimed in claim 1 further comprising:
a recharging power port;
the recharging power port being integrated into the wrench handle; and
the recharging power port being electrically connected to the portable power source.

14. The adjustable wrench with an integrated clutch as claimed in claim 1 further comprising:
an alarm speaker;
the alarm speaker being integrated into the wrench handle;
the alarm speaker being electronically connected to the controller; and
the alarm speaker being electrically connected to the portable power source.

15. The adjustable wrench with an integrated clutch as claimed in claim 1 further comprising:
at least one control button;
the at least one control button being integrated into the wrench handle;
the at least one control button being electronically connected to the controller; and
the at least one control button being electrically connected to the portable power source.

16. The adjustable wrench with an integrated clutch as claimed in claim 1 further comprising:
a power button;
the power button being integrated into the wrench handle; and
the power button being electronically connected to the controller.

17. The adjustable wrench with an integrated clutch as claimed in claim 1 further comprising:
a display screen;
the display screen being integrated into the wrench handle;
the display screen being electronically connected to the controller; and
the display screen being electrically connected to the portable power source.

18. The adjustable wrench with an integrated clutch as claimed in claim 1, wherein a length of the wrench handle is oriented at an acute angle with the proximal handle edge.

19. The adjustable wrench with an integrated clutch as claimed in claim 1 further comprising:
a rounded protrusion; and
the rounded protrusion being laterally connected along the wrench handle.

* * * * *